United States Patent
Kurokawa et al.

(10) Patent No.: US 7,639,058 B2
(45) Date of Patent: Dec. 29, 2009

(54) CLOCK SIGNAL GENERATION CIRCUIT AND SEMICONDUCTOR DEVICE

(75) Inventors: Yoshiyuki Kurokawa, Kanagawa (JP); Takayuki Ikeda, Kanagawa (JP); Masami Endo, Kanagawa (JP); Hiroki Dembo, Kanagawa (JP); Daisuke Kawae, Kanagawa (JP); Takayuki Inoue, Kanagawa (JP); Munehiro Kozuma, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 89 days.

(21) Appl. No.: 12/021,843

(22) Filed: Jan. 29, 2008

(65) Prior Publication Data

US 2008/0211561 A1 Sep. 4, 2008

(30) Foreign Application Priority Data

Feb. 8, 2007 (JP) ............................. 2007-029287

(51) Int. Cl.
G06F 1/04 (2006.01)
H03K 3/00 (2006.01)

(52) U.S. Cl. ................. 327/291; 327/160; 327/292; 327/293; 327/294; 327/299; 375/371

(58) Field of Classification Search .......... 327/291–294
See application file for complete search history.

(56) References Cited

U.S. PATENT DOCUMENTS 5,155,748 A * 10/1992 Rabii ........................... 377/54
5,398,007 A 3/1995 Yamazaki et al.
6,928,127 B2 * 8/2005 Mack et al. .................. 375/371
2002/0167361 A1 11/2002 Ichimaru
2005/0140418 A1 * 6/2005 Muniandy et al. ........... 327/291
2007/0028194 A1 2/2007 Kurokawa (Continued)

FOREIGN PATENT DOCUMENTS

EP 0 590 607 A1 4/1994

(Continued)

OTHER PUBLICATIONS

Akkar, M-L et al, "An Implementation of DES and AES, Secure Against Some Attacks," Proceedings of CHES 2001, LNCS 2162, 2001, pp. 309-318.

(Continued)

*Primary Examiner*—Lincoln Donovan
*Assistant Examiner*—John W Poos
(74) *Attorney, Agent, or Firm*—Cook Alex Ltd.

(57) ABSTRACT

The semiconductor device is provided with a clock signal generation circuit that includes a reference clock signal generation circuit which generates a first reference clock signal, a first counter circuit which counts the number of rising edges of the first reference clock signal by using the first reference clock signal and a synchronizing signal, a second counter circuit which counts the number of rising edges of the first reference clock signal by using an enumerated value of the first counter circuit, a first divider circuit which divides a frequency of the first reference clock signal by using the enumerated value of the first counter circuit and generates a second reference clock signal, and a second divider circuit which divides a frequency of the second reference clock signal and generates a clock signal.

12 Claims, 16 Drawing Sheets

U.S. PATENT DOCUMENTS

2008/0012616 A1* 1/2008 Endo et al. ............... 327/160
2008/0054976 A1 3/2008 Endo et al.

FOREIGN PATENT DOCUMENTS

EP 1 748 344 A2 1/2007
WO WO 2006/118284 A1 11/2006

OTHER PUBLICATIONS

Dembo, H. et al, "RFCPUs on Glass and Plastic Substrates Fabricated by TFT Transfer Technology," IEDM Tech. Dig. Papers, 2005, pp. 1067-1069.

Olsson, T. et al, "Portable Digital Clock Generator for Digital Signal Processing Applications," Electronics Letters, vol. 39, No. 19, Sep. 18, 2003, pp. 1372-1373.

Dehghani, R. et al, "A Low Power Wideband 2.6GHz CMOS Injection-Locked Ring Oscillator Prescaler," 2003 IEEE Radio Frequency Circuits Symposium, 2003, pp. 659-662.

Stork, M., "Digital Building Block for Frequency Synthesizer and Fractional Phase Locked Loops," IEEE, Mobile Future and Symposium on Trends in Communications, 2003, pp. 126-129.

Kurokawa, Y. et al, "32.4 UHF RFCPUs on Flexible and Glass Substrates for Secure RFID Systems," ISSCC 2007, Digest of Technical Papers, IEEE International Solid-State Circuits Conference, Feb. 14, 2007, pp. 574-575.

European Search Report re application No. EP 08001426.9, dated Jun. 17, 2008.

* cited by examiner

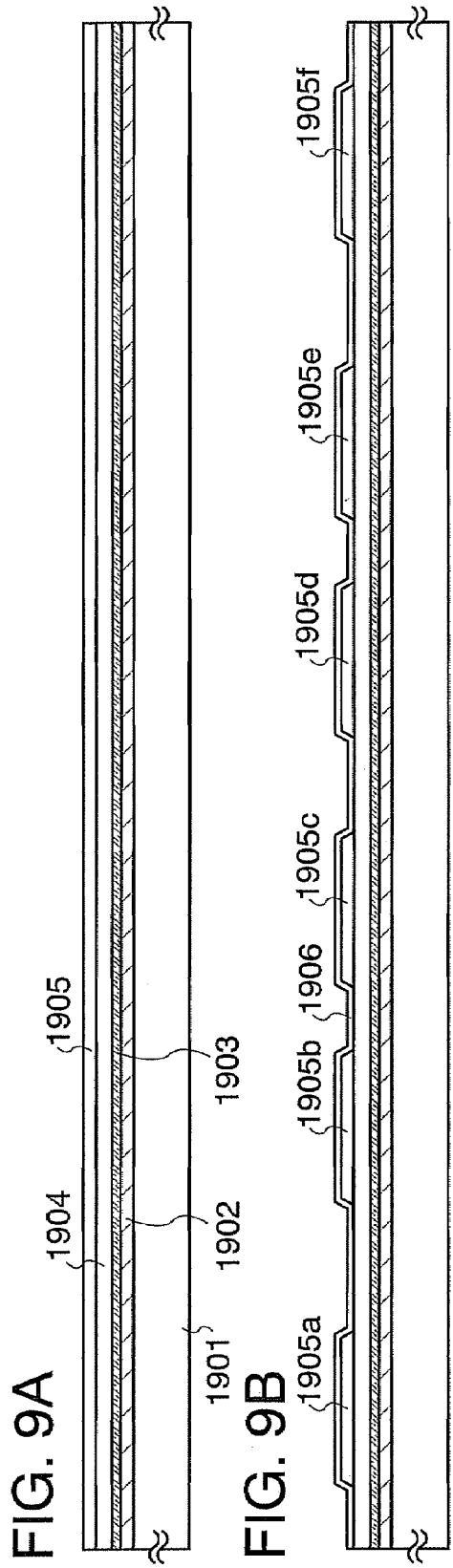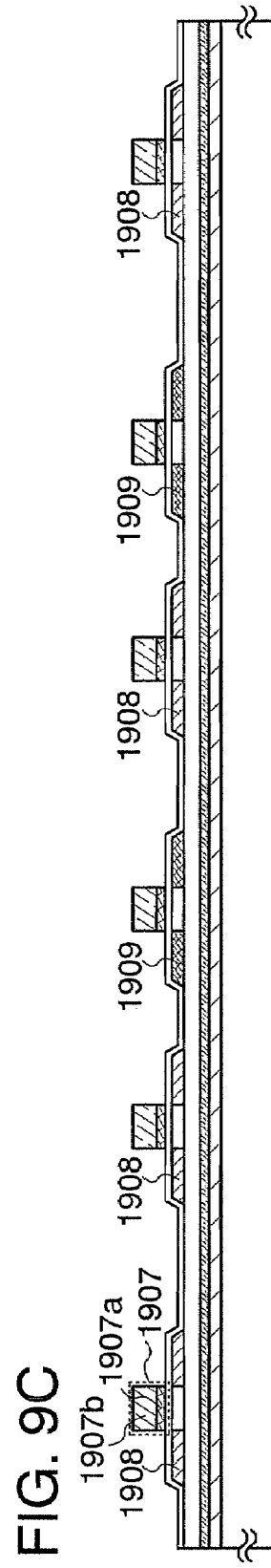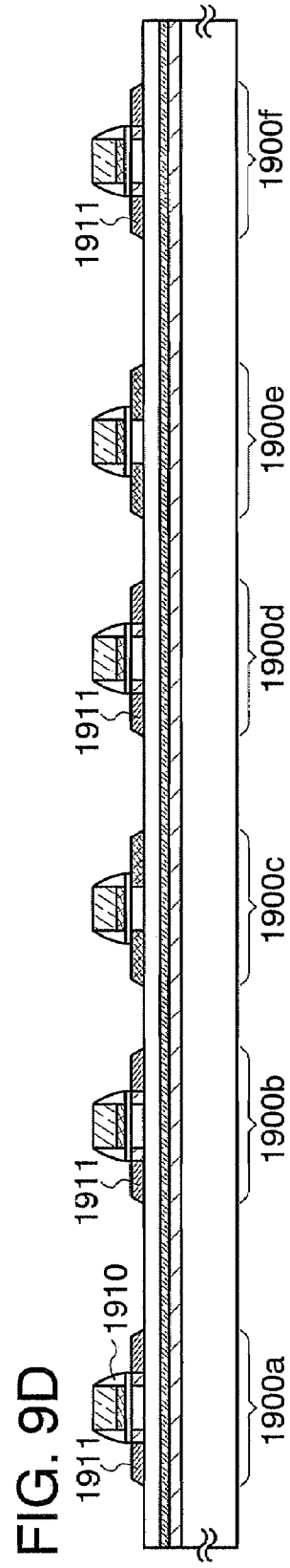

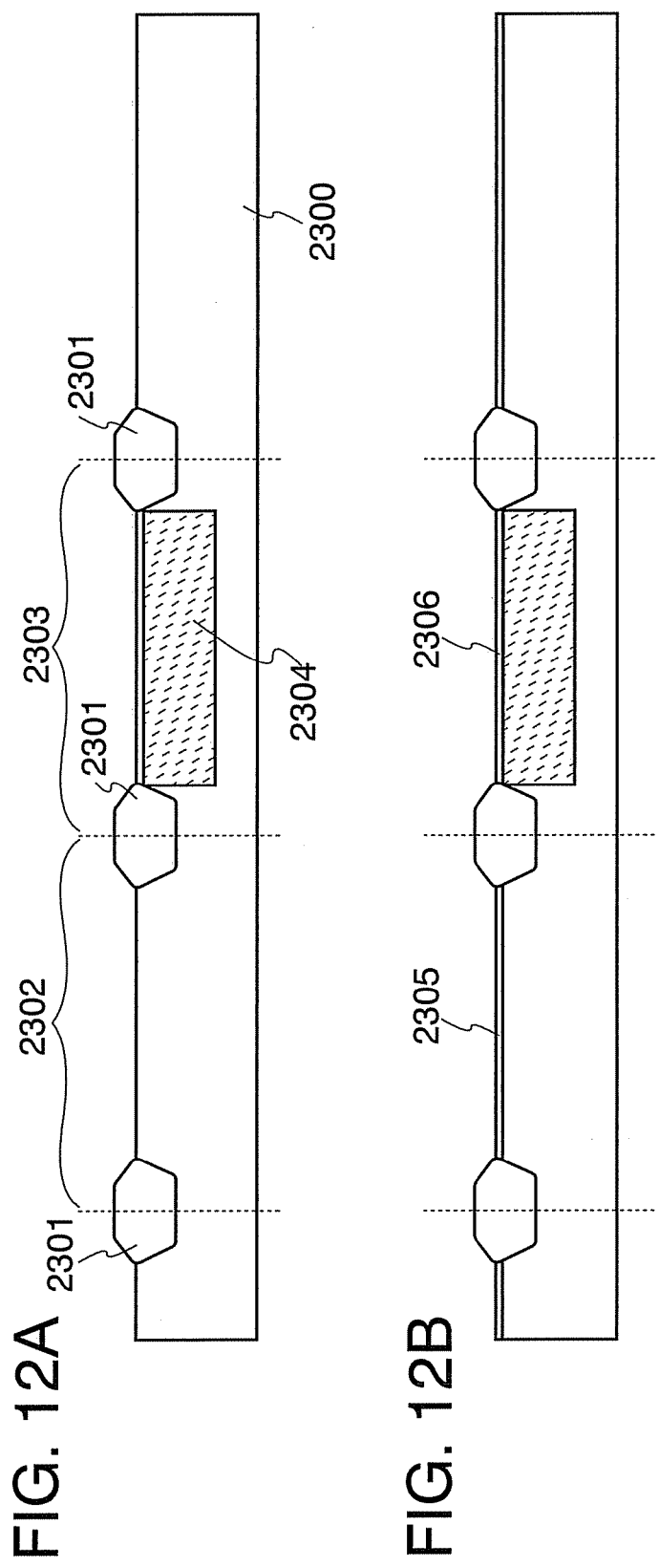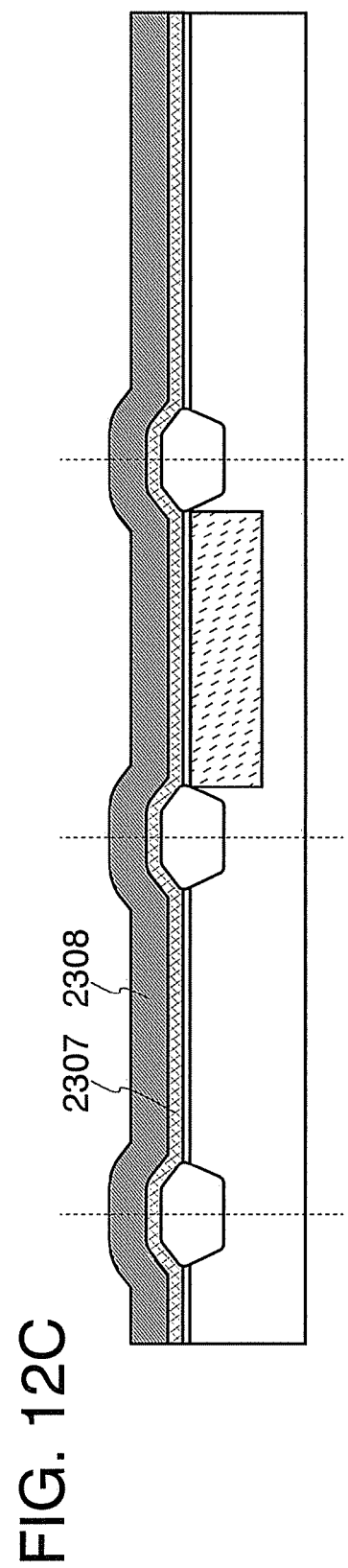

CLOCK SIGNAL GENERATION CIRCUIT AND SEMICONDUCTOR DEVICE

BACKGROUND OF THE INVENTION

1. Field of the Invention

The present invention relates to a circuit that generates a clock signal. In addition, the present invention relates to a semiconductor device provided with a circuit that generates such a clock signal.

2. Description of the Related Art

In recent years, a semiconductor device in which an ultra-small IC chip and an antenna for wireless communication are combined with each other (also referred to as an RFID tag, a wireless tag, an ID tag, or an RF tag) has been attracting attention. The semiconductor device can transmit and receive data without contact, for example, it can write data or read data, by transmission and reception of a communication signal by use of a wireless communication device (which can communicate wirelessly, for example, a reader/writer, a cellular phone, a personal computer, or the like).

As an application field of a semiconductor device which transmits and receives data by a wireless signal, product management in the distribution industry is given as an example. Product management using a bar code and the like is the mainstream at present; however, since bar codes are read optically, data cannot be read in some cases when an interrupting object exists. On the other hand, when data is transmitted and received without contact by use of a wireless communication device, data of the semiconductor device is read wirelessly; thus, data can be read even when an interrupting object exists, if the interrupting object allows a wireless communication signal to pass through. Accordingly, improvement in efficiency, cost reduction, and the like of product management are expected. Further, a wide range of applications including boarding passes, airplane tickets, and automatic payment of fares are expected. A system such that people and objects are identified and managed by a small semiconductor device which transmits and receives data by wireless communication is called radio frequency identification (RFID) and has attracted attention as fundamental technology of the IT society.

RFID technology is one of the central technologies of the ubiquitous computing era. However, RFID tags which form the basis of RFID technology have the following problems: for example, physical flexibility, high secrecy, and economical efficiency. To meet these requests, there are a semiconductor device (hereinafter referred to as an HF wireless communication CPU) which is formed over a flexible substrate or a glass substrate and uses a wireless signal of an HF band (13.56 MHz), and the like (see Reference 1: H. Dembo et al. "RFCPUs on Glass and Plastic Substrates Fabricated by TFT Transfer Technology," IEDM Tech. Dig. Papers, pp. 1067-1069, 2005).

Furthermore, in order to construct an RFID system which is more functional than the above HF wireless communication CPU, a high level of functionality is continuously required for RFID tags; for example, communication distance is extended, power consumption is lowered, an encoding function is enhanced (resistance to side-channel attacks), and the like. For example, as the resistance to side-channel attacks, a Transformed Masking Method (see Reference 2: M. Akkar and C. Giraud, "An implementation of DES and AES, secure against some attacks," Proceedings of CHES 2001, LNCS 2162, pp. 309-318, 2001) and the like can be given.

SUMMARY OF THE INVENTION

A semiconductor device which transmits and receives data by a wireless signal requires very high performance, such as extension of communication distance, low power consumption, miniaturization of chips, and high reliability of encoding communication. For the extension of communication distance, for example, a wireless signal of a UHF band (915 MHz) can be used. Because the wireless signal of a UHF band can be used to perform long-distance communication in principle, compared with a wireless signal of an HF band, the wireless signal of a UHF band has an advantageous effect for extension of communication distance. However, when a communication signal of a UHF band is used, there are many problems in circuit design, such as generation of a stable clock signal in the semiconductor device; therefore, it is necessary to dramatically review the design of an HF wireless communication CPU.

As for a clock signal generation circuit used to generate a clock signal, a PLL circuit is generally used in many cases. The PLL circuit is formed of a voltage control oscillator circuit (VCO), a loop filter circuit, a phase comparator, a divider circuit, and the like. However, in the case where a PLL circuit is mounted on a semiconductor device which transmits and receives data by a wireless signal, it is difficult to obtain a stable clock signal. For example, during a free-running period after a synchronous period is terminated, there is a case where a power supply voltage in the VCO changes in some cases. In addition, there is a case where a frequency of a clock signal does not reach a stable value during the synchronous period. Although these are caused by variations in the characteristics of chips in a manufacturing process, these mean that the frequency of a clock signal is changed or set to be at a non-specified value, which causes a malfunction of the semiconductor device. Furthermore, the semiconductor device which transmits and receives data by a wireless signal is required to be provided at low cost; therefore, an expensive manufacturing process cannot be applied indiscriminately.

In view of the foregoing problems, an object of the present invention is to provide a semiconductor device which operates stably at low cost by providing a clock signal generation circuit that can supply a stable clock signal.

One aspect of the present invention is a clock signal generation circuit including: a first counter circuit to which a first reference clock signal and a synchronizing signal are input and which generates a first reset signal by using the synchronizing signal and counts the number of rising edges of the first reference clock signal in accordance with the first reset signal; a second counter circuit which is connected to the first counter circuit and to which the first reference clock signal is input and which generates a second reset signal by using an enumerated value of the first counter circuit and counts the number of rising edges of the first reference clock signal in accordance with the second reset signal; a first divider circuit which is connected to the first counter circuit and to which the first reference clock signal and the first reset signal are input and which generates a second reference clock signal by dividing a frequency of the first reference clock signal in accordance with the first reset signal; a reset signal generation circuit which is connected to the first counter circuit and the second counter circuit and to which either one of the first reset signal and the second reset signal is input and which outputs either of the input reset signals to a second divider circuit as a third reset signal; and the second divider circuit which is connected to the first divider circuit and the reset signal generation circuit and to which the second reference clock signal and the third reset signal are input and which generates a clock signal by dividing a frequency of the second reference clock signal in accordance with the third reset signal.

The clock signal generation circuit of the present invention can have a structure in which each of the first counter circuit, the second counter circuit, the first divider circuit, and the second divider circuit includes a flip-flop circuit and at least one of a latch circuit, a NOT circuit, an AND circuit, an OR circuit, a NAND circuit, and a NOR circuit.

One aspect of the present invention is a clock signal generation circuit including: a constant voltage circuit which generates a second power supply voltage by using a first power supply voltage; a reference clock signal generation circuit which is connected to the constant voltage circuit and which generates a first reference clock signal by using the second power supply voltage; a first counter circuit which is connected to the reference clock signal generation circuit and to which the first reference clock signal and a synchronizing signal are input and which generates a first reset signal by using the synchronizing signal and counts the number of rising edges of the first reference clock signal in accordance with the first reset signal; a second counter circuit which is connected to the reference clock signal generation circuit and the first counter circuit and to which the first reference clock signal is input and generates a second reset signal by using an enumerated value of the first counter circuit and counts the number of rising edges of the first reference clock signal in accordance with the second reset signal; a first divider circuit which is connected to the reference clock signal generation circuit and the first counter circuit and to which the first reference clock signal and the first reset signal are input and which generates a second reference clock signal by dividing a frequency of the first reference clock signal in accordance with the first reset signal; a reset signal generation circuit which is connected to the first counter circuit and the second counter circuit and to which either one of the first reset signal and the second reset signal is input and which outputs either of the input reset signals to a second divider circuit as a third reset signal; and the second divider circuit which is connected to the first divider circuit and the reset signal generation circuit and to which the second reference clock signal and the third reset signal are input and which generates a clock signal by dividing a frequency of the second reference clock signal in accordance with the third reset signal.

The clock signal generation circuit of the present invention may have a structure in which each of the first counter circuit, the second counter circuit, the first divider circuit, and the second divider circuit includes a flip-flop circuit and at least one of a latch circuit, a NOT circuit, an AND circuit, an OR circuit, a NAND circuit, and a NOR circuit.

One aspect of the present invention is a semiconductor device which wirelessly transmits and receives a signal to and from a wireless communication device through an antenna, and which includes the antenna, a clock signal generation circuit, an RF circuit which generates a power supply voltage from a signal received from the antenna, and a logic circuit which performs arithmetic processing of the signal received from the antenna. The clock signal generation circuit includes: a first counter circuit to which a first reference clock signal generated based on the power supply voltage and a synchronizing signal are input and which generates a first reset signal by using the synchronizing signal and counts the number of rising edges of the first reference clock signal in accordance with the first reset signal; a second counter circuit which is connected to the first counter circuit and to which the first reference clock signal is input and which generates a second reset signal by using an enumerated value of the first counter circuit and counts the number of rising edges of the first reference clock signal in accordance with the second reset signal; a first divider circuit which is connected to the first counter circuit and to which the first reference clock signal and the first reset signal are input and which generates a second reference clock signal by dividing a frequency of the first reference clock signal in accordance with the first reset signal; a reset signal generation circuit which is connected to the first counter circuit and the second counter circuit and to which either one of the first reset signal and the second reset signal is input and which outputs either of the input reset signals to a second divider circuit as a third reset signal; and the second divider circuit which is connected to the first divider circuit and the reset signal generation circuit and to which the second reference clock signal and the third reset signal are input and which generates a clock signal by dividing a frequency of the second reference clock signal in accordance with the third reset signal.

One aspect of the present invention is a semiconductor device which wirelessly transmits and receives a signal to and from a wireless communication device through an antenna, including: the antenna; a clock signal generation circuit; an RF circuit which generates a first power supply voltage from a signal received from the antenna; and a logic circuit which performs arithmetic processing of the signal received from the antenna. The clock signal generation circuit includes: a constant voltage circuit which generates a second power supply voltage by using the first power supply voltage; a reference clock signal generation circuit which is connected to the constant voltage circuit and which generates a first reference clock signal by using the second power supply voltage; a first counter circuit which is connected to the reference clock signal generation circuit and to which the first reference clock signal and a synchronizing signal are input and which generates a first reset signal by using the synchronizing signal and counts the number of rising edges of the first reference clock signal in accordance with the first reset signal; a second counter circuit which is connected to the reference clock signal generation circuit and the first counter circuit and to which the first reference clock signal is input and which generates a second reset signal by using an enumerated value of the first counter circuit and counts the number of rising edges of the first reference clock signal in accordance with the second reset signal; a first divider circuit which is connected to the reference clock signal generation circuit and the first counter circuit and to which the first reference clock signal and the first reset signal are input and which generates a second reference clock signal by dividing a frequency of the first reference clock signal in accordance with the first reset signal; a reset signal generation circuit which is connected to the first counter circuit and the second counter circuit and to which either one of the first reset signal and the second reset signal is input and which outputs either of the input reset signals to a second divider circuit as a third reset signal; and the second divider circuit which is connected to the first divider circuit and the reset signal generation circuit and to which the second reference clock signal and the third reset signal are input and which generates a clock signal by dividing a frequency of the second reference clock signal in accordance with the third reset signal.

The semiconductor device of the present invention may have a structure in which each of the first counter circuit, the second counter circuit, the first divider circuit, and the second divider circuit includes a flip-flop circuit and at least one of a latch circuit, a NOT circuit, an AND circuit, an OR circuit, a NAND circuit, and a NOR circuit.

The semiconductor device of the present invention may have a structure in which the RF circuit includes a power supply circuit, a demodulation circuit, and a modulation circuit.

The semiconductor device of the present invention may have a structure in which the logic circuit includes a control circuit, a central processing unit, a ROM, and a RAM.

The present invention is to manufacture a semiconductor device which generates a clock signal with a constant frequency even in a free-running period after a synchronous period is terminated, by using a clock signal generation circuit provided with a first counter circuit which counts the number of rising edges of a first reference clock signal by use of the input first reference clock signal and synchronizing signal, a second counter circuit which counts the number of rising edges of the first reference clock signal by use of an enumerated value of the first counter circuit, a first divider circuit which divides a frequency of the first reference clock signal by use of the enumerated value of the first counter circuit and generates a second reference clock signal, and a second divider circuit which divides a frequency of the second reference clock signal and generates a clock signal.

According to the present invention, a clock signal generation circuit which can generate a stable clock signal and which operates stably and a semiconductor device provided with the clock signal generation circuit can be provided at low cost.

BRIEF DESCRIPTION OF THE DRAWINGS

FIGS. 9A to 9D are cross-sectional views showing a method for manufacturing a semiconductor device provided with a clock signal generation circuit of the present invention.

FIGS. 12A to 12C are cross-sectional views showing a method for manufacturing a semiconductor device provided with a clock signal generation circuit of the present invention.

DETAILED DESCRIPTION OF THE INVENTION

Figure 1:
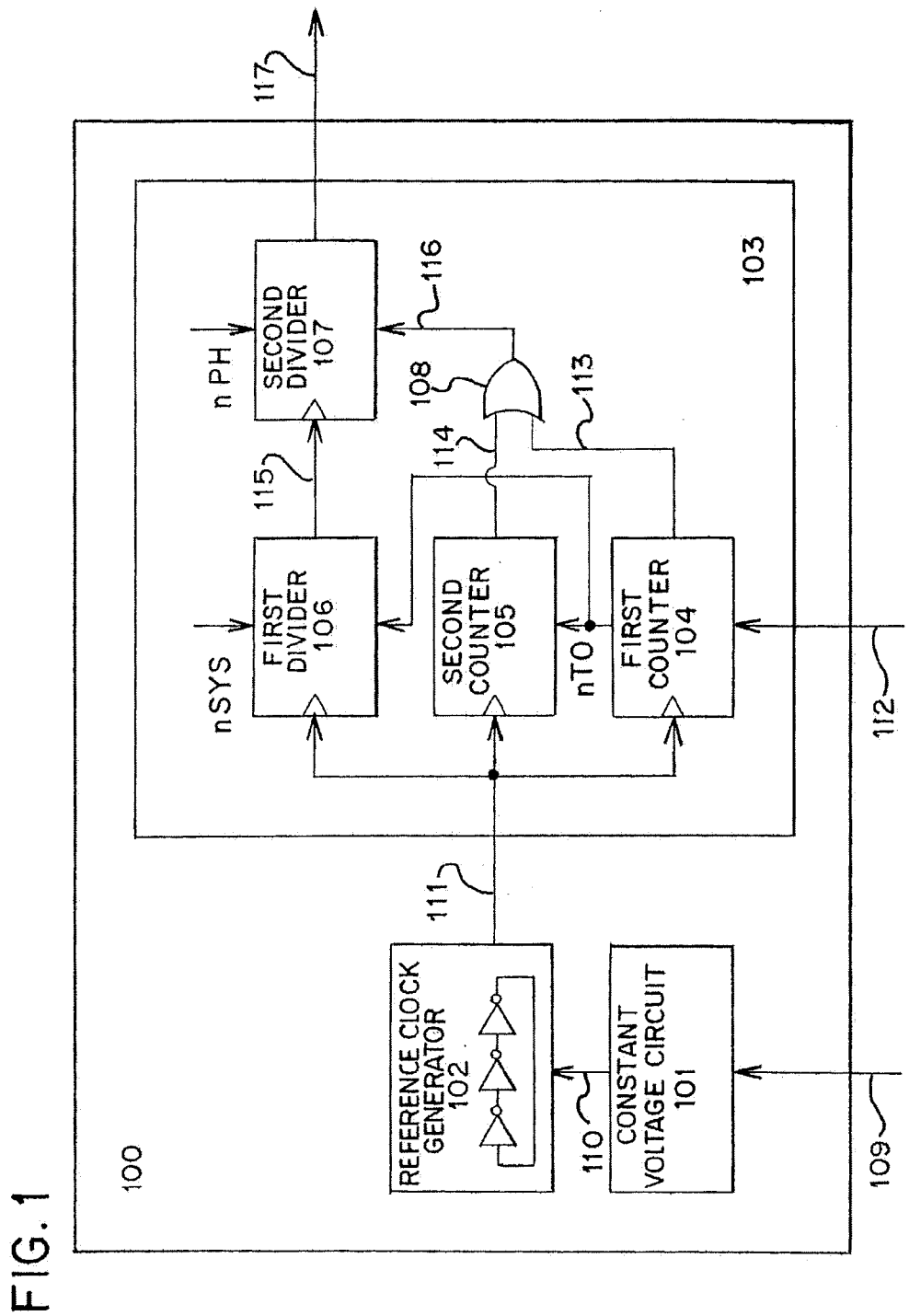
FIG. 1 is a block diagram of a clock signal generation circuit of the present invention.

Hereinafter, embodiment modes and embodiment of the present invention will be described with reference to the accompanying drawings. However, the present invention can be implemented in various modes. As can be easily understood by those skilled in the art, the modes and details of the present invention can be changed in various ways without departing from the spirit and scope of the present invention. Thus, the present invention should not be interpreted as being limited to the following description of the embodiment modes and embodiment. Note that the same portion or a portion having the same function is denoted by the same reference numeral in all drawings for describing embodiment modes and embodiment, and repetitive description thereof is omitted.

Embodiment Mode 1

A clock signal generation circuit of the present invention will be described in this embodiment mode.

A block diagram of a clock signal generation circuit of the present invention is shown in FIG. 1. In FIG. 1, a clock signal generation circuit (also referred to as a clock generator) 100 includes a constant voltage circuit (also referred to as a regulator) 101, a reference clock signal generation circuit 102, and a counter group 103. The counter group 103 includes a first counter circuit 104, a second counter circuit 105, a first divider circuit 106, a second divider circuit 107, and a reset signal generation circuit 108.

Next, a connection relationship of each structure in the clock signal generation circuit 100 will be described.

The constant voltage circuit 101 is connected to the reference clock signal generation circuit 102. The reference clock signal generation circuit 102 is connected to the first counter circuit 104, the second counter circuit 105, and the first divider circuit 106. The first counter circuit 104 is connected to the second counter circuit 105, the first divider circuit 106, and the reset signal generation circuit 108. The second counter circuit 105 is connected to the reset signal generation circuit 108. The first divider circuit 106 is connected to the second divider circuit 107.

The constant voltage circuit 101 generates a second power supply voltage ($VDD_{RO}$) 110 having a constant voltage value from a first power supply voltage ($VDD_{CG}$) 109 and has a function used to supply the second power supply voltage ($VDD_{RO}$) 110 to the reference clock signal generation circuit 102.

The reference clock signal generation circuit 102 has a function used to generate a first reference clock signal ($CLK_{RO}$) 111 having a frequency $f_{RO}$ by use of the second power supply voltage 110. As the reference clock signal generation circuit 102, for example, a ring oscillator, a crystal oscillator, or the like can be used. Note that in the following description, frequencies of the first reference clock signal 111 in a synchronous (SYNC) period and an asynchronous (ASYNC) period are denoted by $f_{ROS}$ and $f_{RONS}$, respectively.

The first counter circuit 104 generates a first reset signal ($RST_{MASTER}$) 113 by use of a synchronizing signal (SYNC) 112 to be effective in a period $T_0$ in a synchronous period and also counts the number of rising edges of the first reference clock signal 111 using the first reset signal 113 as a reset signal. Note that, here, a relationship where $[(n_{T0}-1)/f_{ROS}] \leq T_0 < [(n_{T0}+1)/f_{ROS}]$ is satisfied. The inequality signs indicate that an error is introduced into the equation due to the quantization of $T_0$.

Note that, in this specification, a "signal that is to be effective" (also referred to as "to be asserted") is synonymous with a "signal or logic in an electric circuit that is to be effective (to be active)". In the case of an electric circuit, the direction of current flow, whether there is a current or not, or the like is determined by control of a voltage level, and on or off is expressed according to the direction of current flow or whether there is a current; however, since this expression method is mixed and used according to aims, it is difficult to interpret. Consequently, a signal state can be expressed regardless of a voltage level by expressing the signal state based on whether a signal is effective or non-effective.

In the synchronous period and the asynchronous period, the second counter circuit 105 generates a second reset signal ($RST_{SLAVE}$) 114 whenever the number of rising edges of the first reference clock signal 111 counted equals to $n_{T0}$. That is, the second reset signal 114 serves as a pulse signal of a period $T_{ONS}=n_{T0}/f_{RONS}$.

The first divider circuit 106 divides the frequency of the first reference clock signal 111 by use of the first reset signal 113 as a reset signal and generates a second reference clock signal ($CLK_{SYS}$) 115.

In this embodiment mode, the reset signal generation circuit 108 is formed of an OR circuit and has a function used to output a third reset signal 116 to the second divider circuit 107 when the reset signal is input from the first counter circuit 104 or the second counter circuit 105.

The second divider circuit 107 is driven by the second reference clock signal 115, the frequency of the second reference clock signal 115 is divided up by using the third reset signal ($RST_{PH}=RST_{MASTER}$ or $RST_{SLAVE}$) 116 as a reset signal, and a clock signal (PH) 117 of a logic circuit is generated.

Note that, here, $T_0$ is a value determined by communication standards. In addition, $n_{T0}$ and $n_{SYS}$ are integer values determined by design specifications.

Figure 16:
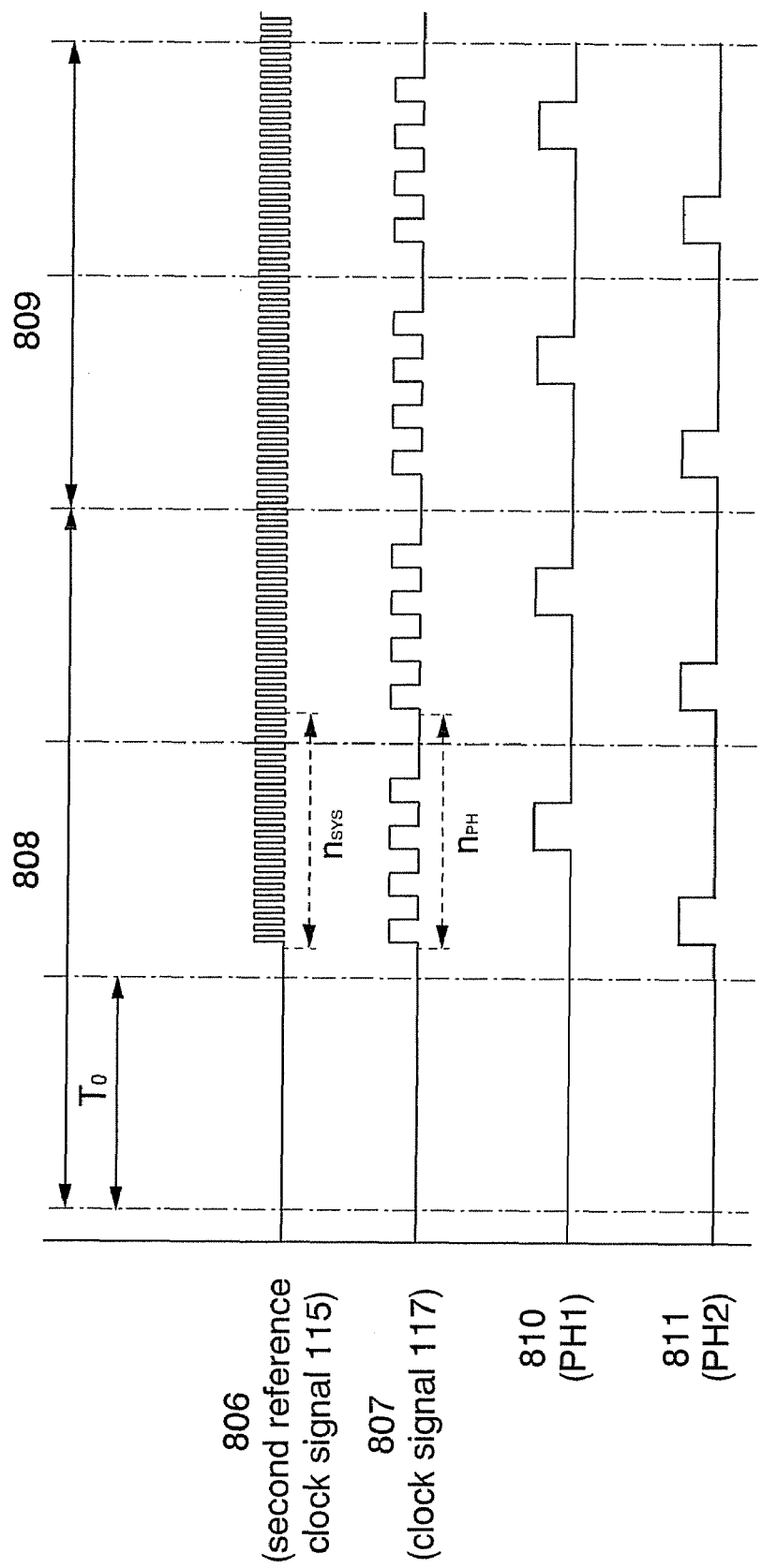
FIG. 16 is a timing chart of a clock signal generation circuit of the present invention.

Next, an operation of the clock signal generation circuit 100 will be described in detail with reference to the timing charts of FIG. 8 and FIG. 16. Note that, in FIG. 8, a first signal waveform 801 corresponds to a signal waveform of the synchronizing signal 112, a second signal waveform 802 corresponds to an enumerated value of the first counter circuit 104, a third signal waveform 803 corresponds to an enumerated value of the second counter circuit 105, a fourth signal waveform 804 corresponds to a signal waveform of the first reset signal 113, a fifth signal waveform 805 corresponds to a signal waveform of the second reset signal 114, a sixth signal waveform 806 corresponds to a signal waveform of the second reference clock signal 115, and a seventh signal waveform 807 corresponds to a signal waveform of the clock signal 117.

In a synchronous period (SYNC period) 808, the synchronizing signal 112 is to be effective in each period $T_0$, as shown by the first signal waveform 801; therefore, in the first counter circuit 104, the first reset signal 113, like the fourth signal waveform 804, is generated by use of the synchronizing signal 112. Specifically, the synchronizing signal 112 is input to a flip-flop circuit which is operated using the first reference clock signal 111 so that a signal which is synchronized with the first reference clock signal 111 is generated.

The first counter circuit 104 counts the number of rising edges of the first reference clock signal 111 using the first reset signal 113 as a reset signal. Enumerated values (count values) correspond to form a pattern like the second signal waveform 802. Note that counting is continued until the next time that the synchronizing signal 112 is effective, and an enumerated value $n_{T0}$ at this point is supplied to the second counter circuit 105 and the first divider circuit 106.

Note that, in this specification, the phrase "to count" is synonymous with "to count the number of rising edges of a signal per unit time."

In an asynchronous period (ASYNC period) 809, because the synchronizing signal 112 is in an ineffective state, the first counter circuit 104 continues counting. In addition, since the first reset signal 113 is not generated, the enumerated value $n_{T0}$ is not updated.

The second counter circuit 105 determines whether the enumerated value no which has been counted by the first counter circuit 104 is a normal value or not, and in the case where it is determined to be a normal value, counting of rising edges of the first reference clock signal 111 is started. Note that, as for the enumerated value, as shown by an arrow 118 and an arrow 119, counting is performed up to the enumerated value $n_{T0}$ which has been counted by the first counter circuit 104 in a period $T_0$ just before the period when counting is performed by the second counter circuit 105 is to start; whenever counting is performed up to a value of $n_{T0}$, the second reset signal 114 that looks like the fifth signal waveform 805 is generated, an enumerated value is reset, and counting is resumed. That is, a counter value of the second counter circuit 105 is set to look like the third signal waveform 803. Here, determination of whether the enumerated value $n_{T0}$ has a normal value or not refers to whether an enumerated value, for example, the enumerated value $n_{T0}$, is normal is determined by whether the enumerated value lies within the range which is decided in advance by a specification. In addition, determination is performed at the time when the enumerated value $n_{T0}$ is updated.

On the other hand, as shown in the asynchronous period 809, in the case where an enumerated value $n_T$ which has been counted by the first counter circuit 104 is not determined as being a normal value, as shown by an arrow 120 and an arrow 121, counting is performed in accordance with the enumerated value $n_{T0}$ which is a normal value counted in the period $T_0$ just before the period $T_0$ in which the enumerated value that is not a normal value is counted by the first counter circuit 104.

The first divider circuit 106 determines whether the enumerated value $n_{T0}$ of the first counter circuit 104 is a normal value or not, in the case where it is determined to be a normal value, the first divider circuit 106 divides the frequency of the first reference clock signal 111 using the first reset signal ($RST_{MASTER}$) as a reset signal and generates the second reference clock signal 115 having $n_{SYS}$ pulses. Specifically, the frequency of the first reference clock signal 111 is divided by a division ratio, m=INT ($n_{T0}/n_{SYS}$). Here, INT is a function used to denote only an integer which is calculated in such a way that a value of $n_{T0}$ divided by $n_{SYS}$ is truncated at the decimal point.

In addition, $n_{SYS}$ which is a design parameter is desirably set as the n-th (n is a natural number) power of two. When $n_{SYS}$ is set as the n-th power of two, a high-order bit other than a low n bit of the enumerated value $n_{T0}$ can be set as a division ratio. In addition, since a large-scale circuit such as a dividing circuit is not required, the chip area of the clock signal generation circuit 100 can be reduced. Note that the signal waveform of the second reference clock signal 115 corresponds to the sixth signal waveform 806. Here, determination of whether the enumerated value $n_{T0}$ has a normal value or not refers to whether an enumerated value, for example, the enumerated value $n_{T0}$, is normal is determined by whether the enumerated value lies within the range which is decided in advance by a specification. In addition, determination is performed at the time when the enumerated value $n_{T0}$ is updated.

The reset signal generation circuit 108 outputs an input reset signal as the third reset signal 116 to the second divider circuit 107 when the first reset signal generated in the first counter circuit or the second reset signal generated in the second counter circuit is input.

The second divider circuit 107 divides the frequency of the second reference clock signal 115 by using the third reset signal 116 as a reset signal and generates $n_{PH}$ pulses until the next period in which the third reset signal 116 is effective. Here, $n_{PH}$ is a design parameter. Specifically, when the third reset signal 116 is effective, the frequency of the second reference clock signal 115 begins to be divided by a division ratio set in advance to generate the clock signal 117. At the same time, the number of pulses of the clock signal 117 is counted, and when the number of pulses reaches $n_{PH}$, generation of the clock signal 117 is stopped. Then, the next time that the third reset signal 116 is effective, generation of the clock signal 117 is resumed. Note that the signal waveform of the clock signal 117 corresponds to the seventh signal waveform 807.

The clock signal 117 is toggled $2n_{PH}$ times after the third reset signal 116 is effective. That is, as shown by a signal waveform 810 and a signal waveform 811 of FIG. 16, both a signal of PH1 with an average frequency of $f_{PH}=n_{PH}/T_0$ and a signal of PH2 with an average frequency of $f_{PHNS}=n_{PH}/T_{0NS}$ can be obtained in the synchronous period and the asynchronous period.

Figure 8:
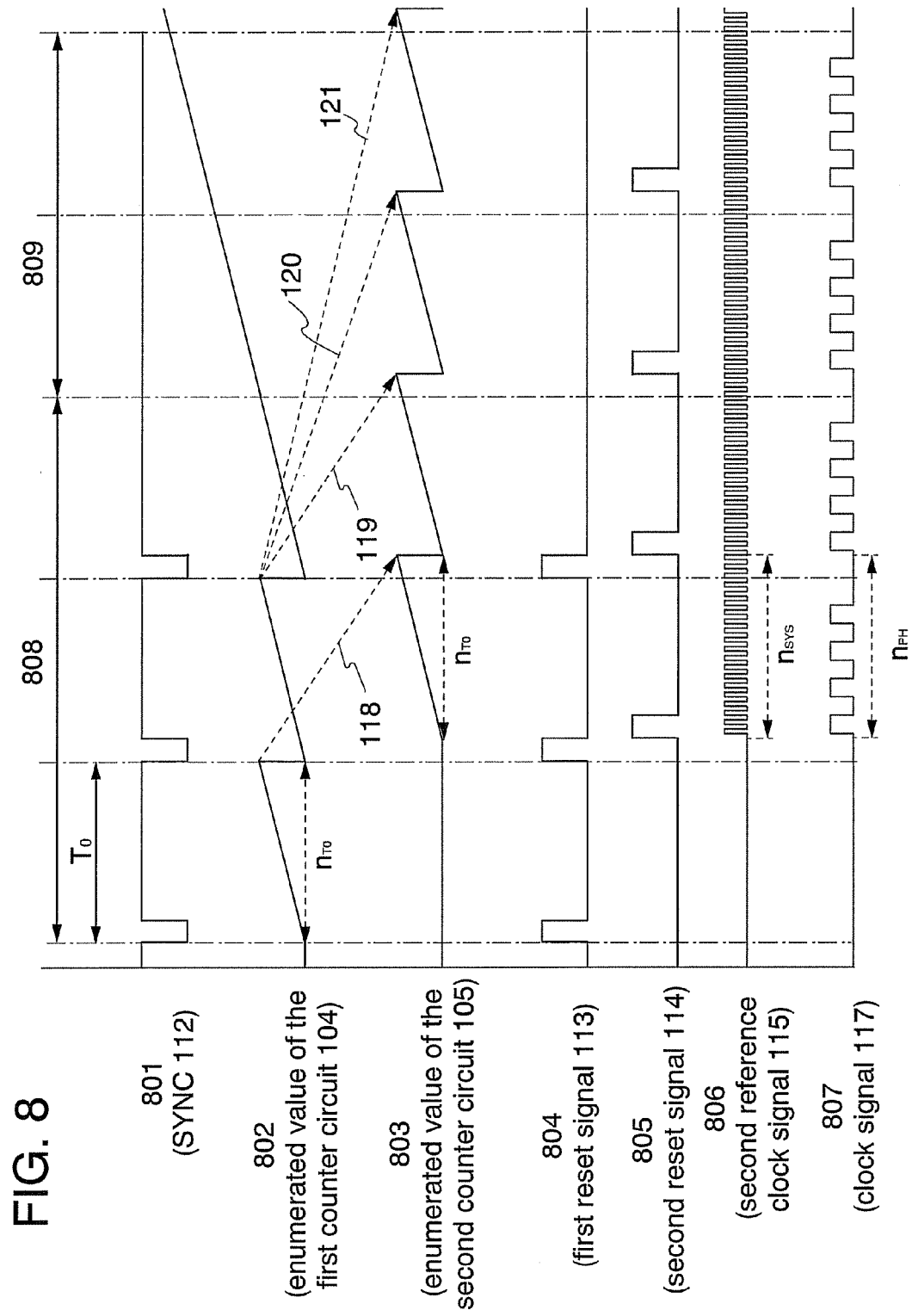
FIG. 8 is a timing chart of a clock signal generation circuit of the present invention.

Note that a dividing operation in the second divider circuit 107 starts frequency dividing by using the first reset signal 113 as the third reset signal 116, as shown by the second reference clock signal 115 of the signal waveform 806 and the clock signal 117 of the signal waveform 807 in FIG. 8; however, in the case where the second reset signal 114 is set as the third reset signal 116, frequency dividing is started by using the second reset signal 114 as the third reset signal 116.

Note that, in this embodiment mode, each of the first counter circuit 104, the second counter circuit 105, the first divider circuit 106, and the second divider circuit 107 is formed of a flip-flop circuit and at least one of a latch circuit, a NOT circuit, an AND circuit, an OR circuit, a NAND circuit, and a NOR circuit so that each operation of counting or frequency dividing can be performed in the clock signal generation circuit 100 of this embodiment mode.

When the above structure is used in the synchronous period 808 and the asynchronous period 809, a signal having $n_{PH}$ pulses can be generated in each period $T_0$. That is, the clock signal 117 which has an average frequency of $1/n_{PH}T_0$ can be generated.

Here, frequency accuracy and frequency variation of a clock signal in the clock signal generation circuit mounted on a semiconductor device of the present invention are considered.

First, frequency accuracy is caused by an error introduced into the equation due to the quantization of $T_0$, namely, a quantization error which is a "remainder" term by counting $T_0$ by use of the counted number of rising edges $n_{T0}$ of the first reference clock signal 111. The quantization error is proportional to the inverse of $n_{T0}$. Accordingly, by increasing $n_{T0}$, namely, by increasing the frequency of the first reference clock signal 111, the quantization error can be reduced comparatively. That is, it is found that frequency accuracy can be easily increased.

Meanwhile, frequency variation is caused by a difference in frequencies of the first reference clock signal 111 in the synchronous period and the asynchronous period. Because of a relationship between $T_0$ and $T_{0NS}$, a relationship where $[(1-1/n_{T0})\cdot(f_{RONS}/f_{ROS})] \leq (f_{PHNS}/f_{PHS}) < [(1+1/n_{T0})\cdot(f_{RONS}/f_{ROS})]$ is obtained quantitatively. That is, by increasing the number of pulses $n_{T0}$, namely, by increasing the frequency of the first reference clock signal 111, a change in frequency can be reduced comparatively. In the clock signal generation circuit of the present invention, when the second power supply voltage 110 which is supplied to the reference clock signal generation circuit 102 is supplied from the constant voltage circuit 101, a change in frequency of the first reference clock signal 111 can be reduced.

As described above, by use of the clock signal generation circuit provided with a plurality of counter circuits and a plurality of divider circuits in this embodiment mode, a clock signal with high frequency accuracy and very low frequency variation can be generated.

In addition, according to the present invention, a semiconductor device which can realize a stable operation even with wireless communication at the UHF band, for example, can be provided at low cost.

Embodiment Mode 2

In this embodiment mode, a semiconductor device provided with the clock signal generation circuit described in Embodiment Mode 1 will be described.

Figure 3:
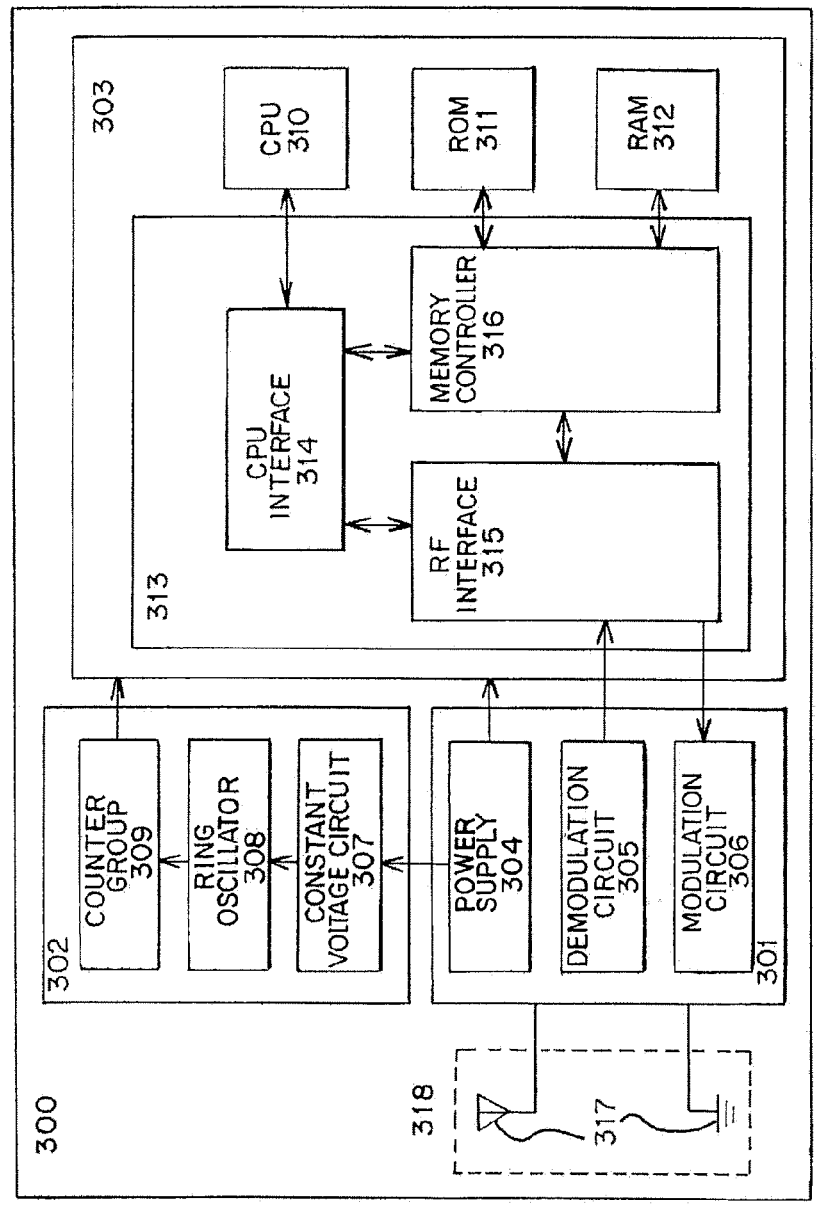
FIG. 3 is a block diagram of an example of a semiconductor device provided with a clock signal generation circuit of the present invention.

A structure of the semiconductor device of this embodiment mode is shown in FIG. 3. A semiconductor device 300 includes an RF circuit 301, a clock signal generation circuit 302, a logic circuit 303, and an antenna 317 in an antenna portion 318. Note that, although not shown in FIG. 3, the semiconductor device 300 transmits and receives a wireless signal to and from an external circuit such as a wireless communication device via the antenna 317.

Next, a structure of each circuit will be described. The RF circuit 301 includes a power supply circuit 304, a demodulation circuit 305, and a modulation circuit 306. The clock signal generation circuit 302 includes a constant voltage circuit 307, a ring oscillator 308, and a counter group 309. In addition, the logic circuit 303 includes a controller 313, a CPU (also referred to as a central processing unit) 310, a ROM (read only memory) 311, and a RAM (random access memory) 312.

The controller 313 includes a CPU interface 314, an RF interface 315, and a memory controller 316.

In the RF circuit 301, the power supply circuit 304 is formed of a rectifier circuit and a storage capacitor and has a function used to supply a first power supply voltage to another circuit. The demodulation circuit 305 is formed of a rectifier circuit and an LPF (low-pass filter) and has a function used to extract a command or data from a communication signal. The modulation circuit 306 has a function used to modulate transmission data, and modulated data is transmitted as a transmitted signal from the antenna 317.

Next, an operation of a semiconductor device of this embodiment mode will be described. First, the semiconductor device 300 receives a received signal which is transmitted from an external communication device. The received signal is demodulated by the demodulation circuit 305 and then input to the RF interface 315 in the controller 313. The received signal which is input to the RF interface 315 is processed arithmetically by the CPU 310 through the CPU interface 314. In addition, by use of the received signal input to the RF interface 315, access to the ROM 311 and the RAM 312 is performed through the memory controller 316.

Transmission data is generated after arithmetic processing is performed by the CPU 310 and data in the ROM 311 and the RAM 312 is input and output, the transmission data is modulated in the modulation circuit 306, and a transmitted signal is transmitted from the antenna 317 to the communication device.

Note that the clock signal generation circuit 100 of Embodiment Mode 1 shown in FIG. 1 can be applied to the clock signal generation circuit 302 in this embodiment mode. Here, the constant voltage circuit 101, the reference clock signal generation circuit 102, and the counter group 103 correspond to the constant voltage circuit 307, the ring oscillator 308, and the counter group 309, respectively.

As described above, by use of a semiconductor device provided with the clock signal generation circuit of the present invention, a clock signal with high frequency accuracy and very low frequency variation can be generated.

In addition, the semiconductor device provided with the clock signal generation circuit of the present invention can realize a stable operation, and a semiconductor device which can realize a stable operation even with wireless communication that uses the UHF band, for example, can be provided at low cost.

Embodiment Mode 3

In this embodiment mode, one example of a method for manufacturing a semiconductor device described in the above embodiment mode will be described. In this embodiment mode, a structure in which a semiconductor device including an antenna circuit is provided over the same substrate will be described.

First, as shown in FIG. 9A, an insulating film 1902 is formed over one surface of a substrate 1901, and a peeling layer 1903 is formed over the substrate 1901 with the insulating film 1902 interposed therebetween, and then an insulating film 1904 functioning as a base film and a semiconductor film 1905 (e.g., a film containing amorphous silicon) are formed thereover. Note that the insulating film 1902, the peeling layer 1903, the insulating film 1904, and the semiconductor film 1905 can be formed consecutively.

The substrate used for the substrate 1901 is selected from a glass substrate, a quartz substrate, a ceramic substrate, a metal substrate (e.g., a stainless steel substrate), a semiconductor substrate such as an Si substrate, or the like. Alternatively, a plastic substrate made of polyethylene terephthalate (PET), polyethylene naphthalate (PEN), polyether sulfone (PES), acrylic, or the like can be selected.

In this step, although the peeling layer 1903 is provided over the entire surface of the substrate 1901 with the insulating film 1902 interposed therebetween, the peeling layer can also be selectively provided by a photolithography method after being provided over the entire surface of the substrate 1901.

The insulating films 1902 and 1904 are formed using a material such as silicon oxide, silicon nitride, silicon oxynitride ($SiO_xN_y$, where x>y>0), or silicon nitride oxide ($SiN_xO_y$, where x>y>0) by a CVD method, a sputtering method, or the like. For example, when each of the insulating films 1902 and 1904 is formed to have a two-layer structure, a silicon nitride oxide film may be formed as a first insulating film and a silicon oxynitride film may be formed as a second insulating film. In addition, a silicon nitride film may be formed as a first insulating film and a silicon oxide film may be formed as a second insulating film. The insulating film 1902 functions as a blocking layer which prevents an impurity element contained in the substrate 1901 from being mixed into the peeling layer 1903 or elements formed thereover. The insulating film 1904 functions as a blocking layer which prevents an impurity element contained in the substrate 1901 or the peeling layer 1903 from being mixed into elements formed over the insulating film 1904. In this manner, by providing the insulating films 1902 and 1904 which function as the blocking layers, an impurity element, such as an alkali metal element such as Na or an alkaline earth metal element, contained in the substrate 1901 can be prevented from adversely affecting the element formed over the substrate 1901, and an impurity element contained in the peeling layer 1903 can be prevented from adversely affecting the element formed over the peeling layer 1903. Note that, when quartz is used for the substrate 1901, for example, the insulating films 1902 and 1904 may be omitted.

The peeling layer 1903 may be formed using a metal film, a stacked structure of a metal film and a metal oxide film, or the like. As a metal film, either a single layer or stacked layers are formed using an element selected from tungsten, molybdenum, titanium, tantalum, niobium, nickel, cobalt, zirconium, zinc, ruthenium, rhodium, palladium, osmium, and iridium, or an alloy material or a compound material containing the element as its main component. In addition, such materials can be formed by a sputtering method, various CVD methods such as a plasma CVD method, or the like. A stacked structure of a metal film and a metal oxide film can be obtained by the steps of forming the above-described metal film and applying plasma treatment thereto under an oxygen atmosphere or an $N_2O$ atmosphere or applying heat treatment thereto under an oxygen atmosphere or an $N_2O$ atmosphere, and thereby forming oxide or oxynitride of the metal film on the metal film. For example, when a tungsten film is provided as a metal film by a sputtering method, a CVD method, or the like, a metal oxide film made of tungsten oxide can be formed on the surface of the tungsten film by applying plasma treatment to the tungsten film. In that case, the tungsten oxide can be represented by $WO_x$ where x is in the range of 2 to 3. For example, there are cases where x is 2 ($WO_2$), x is 2.5 ($W_2O_5$), x is 2.75 ($W_4O_{11}$), x is 3 ($WO_3$), and the like. When forming tungsten oxide, there is no particular limitation on the value of x, and thus, which of the above oxides is to be formed may be determined based on the etching rate or the like. In addition, for example, after a metal film (e.g., tungsten) is formed, an insulating film formed of silicon oxide or the like may be formed over the metal film by a sputtering method, and also metal oxide (e.g., tungsten oxide over tungsten) may be formed over the metal film. Moreover, the above-described high-density plasma treatment may be applied as the plasma treatment, for example. Besides, metal nitride or metal oxynitride may also be formed. In that case, plasma treatment or heat treatment may be applied to the metal film under a nitrogen atmosphere or under an atmosphere containing nitrogen and oxygen.

The semiconductor film 1905 is formed to a thickness of greater than or equal to 25 nm and less than or equal to 200 nm (preferably, greater than or equal to 30 nm and less than or equal to 150 nm) by a sputtering method, an LPCVD method, a plasma CVD method, or the like.

Next, as shown in FIG. 9B, the amorphous semiconductor film 1905 is crystallized by laser beam irradiation. Note that the crystallization of the amorphous semiconductor film 1905 may also be conducted by a method combining the laser crystallization with a thermal crystallization method using RTA or an annealing furnace or with a thermal crystallization method using a metal element that promotes the crystallization, or the like. After that, the crystallized semiconductor film is etched into desired shapes, whereby crystalline semiconductor films 1905a, 1905b, 1905c, 1905d, 1905e, and 1905f are formed. Then, a gate insulating film 1906 is formed so as to cover the semiconductor films 1905a to 1905f.

The gate insulating film 1906 is formed using a material such as silicon oxide, silicon nitride, silicon oxynitride ($SiO_xN_y$, where x>y>0), or silicon nitride oxide ($SiN_xO_y$, where x>y>0) by a CVD method, a sputtering method, or the like. For example, when the gate insulating film 1906 is formed to have a two-layer structure, it is preferable to form a silicon oxynitride film as a first insulating film and a silicon nitride oxide film as a second insulating film. Alternatively, it is also preferable to form a silicon oxide film as a first insulating film and a silicon nitride film as a second insulating film.

An example of a manufacturing process of the crystallized semiconductor films 1905a to 1905f is briefly described below. First, an amorphous semiconductor film with a thickness of greater than or equal to 50 nm and less than or equal to 60 nm is formed by a plasma CVD method. Then, a solution containing nickel which is a metal element used to promote crystallization is made to be retained on the amorphous semiconductor film, which is followed by dehydrogenation treatment (at 500° C. for one hour) and thermal crystallization treatment (at 550° C. for four hours). In this way, a crystalline semiconductor film is formed. Then, the crystalline semiconductor film is irradiated with a laser beam by a photolithography method and etched so that the crystalline semiconductor films 1905a to 1905f are formed. Note that crystallization of the amorphous semiconductor film may be conducted using laser beam irradiation only, without performance of thermal crystallization which uses a metal element that promotes crystallization.

As a laser oscillator used for crystallization, either a continuous wave laser (a CW laser) or a pulsed laser can be used. As a laser that can be used here, there are gas lasers such as an Ar laser, a Kr laser, and an excimer laser; a laser in which single-crystalline YAG, $YVO_4$, forsterite ($Mg_2SiO_4$), $YAlO_3$, or $GdVO_4$ or polycrystalline (ceramic) YAG, $Y_2O_3$, $YVO_4$, $YAlO_3$, or $GdVO_4$ is doped with one or more laser media selected from among Nd, Yb, Cr, Ti, Ho, Er, Tm, and Ta as dopant; a glass laser; a ruby laser; an alexandrite laser; a Ti:sapphire laser; a copper vapor laser; and a metal vapor laser. When irradiation is conducted with the fundamental wave of such a laser beam or the second to fourth harmonics of the fundamental wave, crystals with a large grain size can be obtained. For example, the second harmonic (532 nm) or the third harmonic (355 nm) of an $Nd:YVO_4$ laser (the fundamental wave of 1064 nm) can be used. In this case, a laser power density of about greater than or equal to 0.01 $MW/cm^2$ and less than or equal to 100 $MW/cm^2$ (preferably, greater than or equal to 0.1 $MW/cm^2$ and less than or equal to 10 $MW/cm^2$) is required, and irradiation is conducted with a scanning rate of about greater than or equal to 10 cm/sec and less than or equal to 2000 cm/sec. Note that the laser in which single-crystalline YAG, $YVO_4$, forsterite ($Mg_2SiO_4$), $YAlO_3$, or $GdVO_4$ or polycrystalline (ceramic) YAG, $Y_2O_3$, $YVO_4$, $YAlO_3$, or $GdVO_4$ is doped with one or more laser media selected from among Nd, Yb, Cr, Ti, Ho, Er, Tm, and Ta as dopant; an Ar laser, or a Ti:sapphire laser can be used as a CW laser, whereas they can also be used as pulsed laser with a repetition rate of 10 MHz or more by being combined with mode locking. When a laser beam with a repetition rate of 10 MHz or more is used, it is possible for a semiconductor film to be irradiated with the next pulse after during the period in which the semiconductor film is melted by the previous laser and solidified. Therefore, unlike the case of using a pulsed laser with a low repetition rate, a solid-liquid interface in the semiconductor film can be continuously moved. Thus, crystal grains which have grown continuously in the scanning direction can be obtained.

The gate insulating film 1906 may be formed by oxidization or nitridation of the surfaces of the semiconductor films 1905a to 1905f by the above-described high-density plasma treatment. For example, plasma treatment with a mixed gas of a noble gas such as He, Ar, Kr, or Xe, and oxygen, nitrogen oxide, ammonia, nitrogen, or hydrogen is used. When plasma is excited by the introduction of microwaves, plasma with a low electron temperature and a high electron density can be generated. With oxygen radicals (which may include OH radicals) or nitrogen radicals (which may include NH radicals) which are generated by the high-density plasma, the surfaces of the semiconductor films can be oxidized or nitrided.

By such high-density plasma treatment, an insulating film with a thickness of greater than or equal to 1 nm and less than or equal to 20 nm, typically greater than or equal to 5 nm and less than or equal to 10 nm, is formed on the semiconductor films. Since the reaction in this case is a solid-phase reaction, interface state density between the insulating film and the semiconductor films can be quite low. Since such high-density plasma treatment directly oxidizes (or nitrides) the semiconductor films (crystalline silicon or polycrystalline silicon), the insulating film can be formed to have a thickness with extremely little unevenness. In addition, since crystal grain boundaries of crystalline silicon are not strongly oxidized, an excellent state results. That is, by the solid-phase oxidation of the surfaces of the semiconductor films by high-density plasma treatment which is described in this embodiment mode, an insulating film with a uniform thickness and low interface state density can be formed without excessive oxidation reaction at the crystal grain boundaries.

As the gate insulating film 1906, an insulating film only formed by high-density plasma treatment may be used, or a stacked layer which is obtained by depositing an insulating film formed of at least one of silicon oxide, silicon oxynitride, and silicon nitride on the insulating film by a CVD method using plasma or thermal reaction may be used. In either case, the amount of variation in characteristics of transistors which each include an insulating film formed by high-density plasma treatment as part or all of its gate insulating film can be reduced.

In addition, the semiconductor films 1905a to 1905f, which are obtained by irradiation of a semiconductor film with a continuous wave laser beam or a laser beam oscillated with a repetition rate of 10 MHz or more and scanning of the semiconductor film in one direction to crystallize the semiconductor film, have a characteristic in that their crystals grows in the beam scanning direction. A transistor is arranged so that its channel length direction (direction in which carriers move when a channel formation region is formed) is aligned with the scanning direction, and the above-described gate insulating film 1906 is combined with the semiconductor film, so that a thin film transistor (TFT) with high electron field-effect mobility and few variations in characteristics can be obtained.

Next, a first conductive film and a second conductive film are stacked over the gate insulating film 1906. Here, the first conductive film is formed to have a thickness of greater than or equal to 20 nm and less than or equal to 100 nm by a CVD method, a sputtering method, or the like. The second conductive film is formed to have a thickness of greater than or equal to 100 nm and less than or equal to 400 nm. The first conductive film and the second conductive film are each formed of an element selected from among tantalum, tungsten, titanium, molybdenum, aluminum, copper, chromium, niobium, and the like, or an alloy material or a compound material containing the element as its main component. Alternatively, the first conductive film and the second conductive film are formed of a semiconductor material typified by polycrystalline silicon doped with an impurity element such as phosphorus. As examples of combinations of the first conductive film and the second conductive film, a tantalum nitride film and a tungsten film; a tungsten nitride film and a tungsten film; a molybdenum nitride film and a molybdenum film; and the like can be given. Tungsten and tantalum nitride have high heat resistance. Therefore, after forming the first conductive film and the second conductive film, thermal treatment can be applied thereto for the purpose of heat activation. In addition, in the case where not a two-layer structure but a three-layer structure is employed, it is preferable to employ a stacked structure of a molybdenum film, an aluminum film, and another molybdenum film.

Next, a resist mask is formed by a photolithography method, and etching treatment for forming gate electrodes and gate lines is performed. Thus, gate electrodes 1907 are formed above the semiconductor films 1905*a* to 1905*f*. Here, a stacked structure of a first conductive film 1907*a* and a second conductive film 1907*b* is shown as an example of the gate electrode 1907.

Next, as shown in FIG. 9C, the semiconductor films 1905*a* to 1905*f* are doped at a low concentration with an impurity element which imparts n-type conductivity, using the gate electrodes 1907 as masks, by an ion doping method or an ion implantation method. Then, a resist mask is selectively formed by a photolithography method, and any of the semiconductor films 1905*a* to 1905*f* are doped at high concentration with an element which imparts p-type conductivity. As an impurity element which imparts n-type conductivity, phosphorus, arsenic, or the like can be used. As an element which imparts p-type conductivity, boron, aluminum, gallium, or the like can be used. Here, phosphorus is used as an impurity element which imparts n-type conductivity and is selectively introduced into the semiconductor films 1905*a* to 1905*f* so that phosphorus is contained at concentrations of greater than or equal to $1 \times 10^{15}/cm^3$ and less than or equal to $1 \times 10^{19}/cm^3$. Thus, n-type impurity regions 1908 are formed. In addition, boron is used as an element which imparts p-type conductivity and is selectively introduced into the semiconductor films 1905*c* and 1905*e* so as to be contained at concentrations of greater than or equal to $1 \times 10^{19}/cm^3$ and less than or equal to $1 \times 10^{20}/cm^3$. Thus, p-type impurity regions 1909 are formed.

Subsequently, an insulating film is formed so as to cover the gate insulating film 1906 and the gate electrodes 1907. The insulating film is formed to be either a single layer or a stacked layer of at least one of a film containing an inorganic material such as silicon, silicon oxide, or silicon nitride or a film containing an organic material such as an organic resin by a plasma CVD method, a sputtering method, or the like. Next, the insulating film is selectively etched by anisotropic etching mainly in the perpendicular direction so that insulating films 1910 (also referred to as sidewalls) which are in contact with the side surfaces of the gate electrodes 1907 are formed. The insulating films 1910 are used as doping masks for forming LDD (lightly doped drain) regions.

Next, the semiconductor films 1905*a*, 1905*b*, 1905*d*, and 1905*f* are doped with an impurity element which imparts n-type conductivity at high concentration, using the resist mask formed by a photolithography method, the gate electrodes 1907, and the insulating films 1910 as masks. Thus, n-type impurity regions 1911 are formed. Here, phosphorus (P) is used as an impurity element which imparts n-type conductivity, and is selectively introduced into the semiconductor films 1905*a*, 1905*b*, 1905*d*, and 1905*f* so as to be contained at concentrations of greater than or equal to $1 \times 10^{19}/cm^3$ and less than or equal to $1 \times 10^{20}/cm^3$. Thus, the n-type impurity regions 1911 with a higher concentration of impurity than that of the impurity regions 1908 are formed.

Through the above-described steps, as shown in FIG. 9D, n-channel thin film transistors 1900*a*, 1900*b*, 1900*d*, and 1900*f*, and p-channel thin film transistors 1900*c* and 1900*e* are formed.

In the n-channel thin film transistor 1900*a*, a channel formation region is formed in a region of the semiconductor film 1905*a* which overlaps with the gate electrode 1907; the impurity region 1911 which forms a source or drain region is formed in a region of the semiconductor film 1905*a* which does not overlap with the gate electrode 1907 and the insulating film 1910; and a low concentration impurity region (LDD region) is formed in a region which overlaps with the insulating film 1910 and between the channel formation region and the impurity region 1911. In addition, channel formation regions, low concentration impurity regions, and the impurity regions 1911 are formed in the n-channel thin film transistors 1900*b*, 1900*d*, and 1900*f*.

In the p-channel thin film transistor 1900*c*, a channel formation region is formed in a region of the semiconductor film 1905*c* which overlaps with the gate electrode 1907, and the impurity region 1909 which forms a source or drain region is formed in a region which does not overlap with the gate electrode 1907. Similarly, a channel formation region and the impurity region 1909 are formed in the p-channel thin film transistor 1900*e*. Here, although LDD regions are not formed in the p-channel thin film transistors 1900*c* and 1900*e*, LDD regions may be provided in the p-channel thin film transistors or a structure without LDD regions may be applied to the n-channel thin film transistors.

Figure 10A:
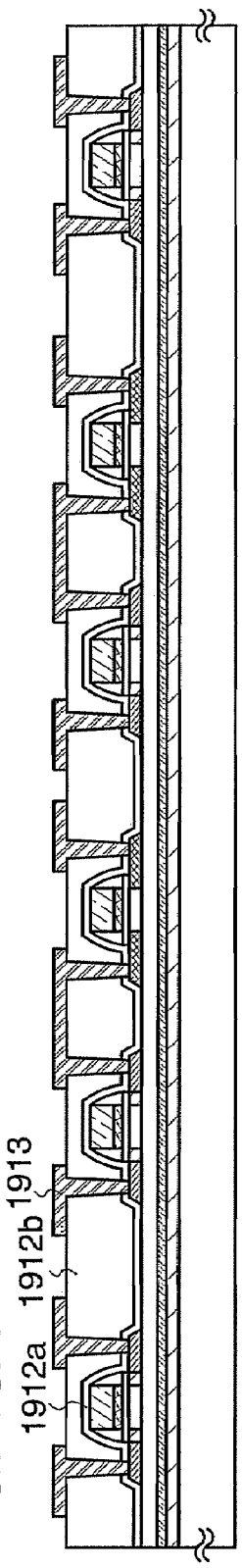
FIGS. 10A to 10C are cross-sectional views showing a method for manufacturing a semiconductor device provided with a clock signal generation circuit of the present invention.

Next, as shown in FIG. 10A, an insulating film with a single layer or stacked layers is formed so as to cover the semiconductor films 1905*a*, 1905*b*, 1905*c*, 1905*d*, 1905*e*, and 1905*f*, the gate electrodes 1907, and the like. Then, a conductive film 1913 electrically connected to the impurity regions 1909 and 1911 which form the source and drain regions of the thin film transistors 1900*a* to 1900*f* is formed over the insulating film. The insulating film is formed either in a single layer or in stacked layers, using at least one of an inorganic material such as silicon oxide or silicon nitride, an organic material such as polyimide, polyamide, benzocyclobutene, acrylic, or epoxy, a siloxane material, or the like by a CVD method, a sputtering method, an SOG method, a droplet discharging method, a screen printing method, or the like. Here, the insulating film is formed to have two layers such that a first insulating film 1912*a* is formed of a silicon nitride oxide film and a second insulating film 1912*b* is formed of a silicon oxynitride film. In addition, the conductive film 1913 can form the source and drain electrodes of the semiconductor films 1905*a* to 1905*f*.

Note that before the insulating films 1912*a* and 1912*b* are formed or after one or both of them is/are formed, heat treatment is preferably applied for recovery of the crystallinity of the semiconductor films, activation of the impurity element which has been added into the semiconductor films, or hydrogenation of the semiconductor films. As the heat treatment, thermal annealing, laser annealing, RTA, or the like is preferably applied.

The conductive film 1913 is formed of either a single layer or a stacked layer of an element selected from among aluminum, tungsten, titanium, tantalum, molybdenum, nickel, platinum, copper, gold, silver, manganese, neodymium, carbon, and silicon, or an alloy material or a compound material containing the element as its main component by a CVD method, a sputtering method, or the like. An alloy material containing aluminum as its main component corresponds to, for example, a material which contains aluminum as its main component and also contains nickel, or a material which contains aluminum as its main component and also contains nickel and one or both of carbon and silicon. The conductive film 1913 is preferably formed to have a stacked structure of a barrier film, an aluminum-silicon (Al—Si) film, and a barrier film or a stacked structure of a barrier film, an aluminum silicon (Al—Si) film, a titanium nitride film, and a barrier film. Note that the "barrier film" corresponds to a thin film formed of titanium, titanium nitride, molybdenum, or molybdenum nitride. Aluminum and aluminum silicon are the most suitable material for forming the conductive film 1913 because they have low resistance value and are inexpensive. When barrier layers are provided in the top layer and the bottom layer, generation of hillocks of aluminum or aluminum silicon can be prevented. In addition, when a barrier film formed of titanium which is an element having a high reducing property is formed, even when there is a thin natural oxide film formed on the crystalline semiconductor film, the natural oxide film can be chemically reduced, and a favorable contact between the conductive film 1913 and the crystalline semiconductor film can be obtained.

Next, an insulating film 1914 is formed so as to cover the conductive film 1913, and conductive films 1915*a* and 1915*b* electrically connected to the conductive film 1913 which forms the source electrode or the drain electrode of each of the semiconductor films 1905*a* and 1905*f* are formed over the insulating film 1914. In addition, conductive films 1916*a* and 1916*b* electrically connected to the conductive film 1913 which forms the source electrode or the drain electrode of each of the semiconductor films 1905*b* and 1905*e* are formed. Note that the conductive films 1915*a* and 1915*b* and the conductive films 1916*a* and 1916*b* may be formed using the same material at the same time. The conductive films 1915*a* and 1915*b* and the conductive films 1916*a* and 1916*b* may be formed using any of the above-described materials which can be used for the conductive film 1913.

Figure 10B:
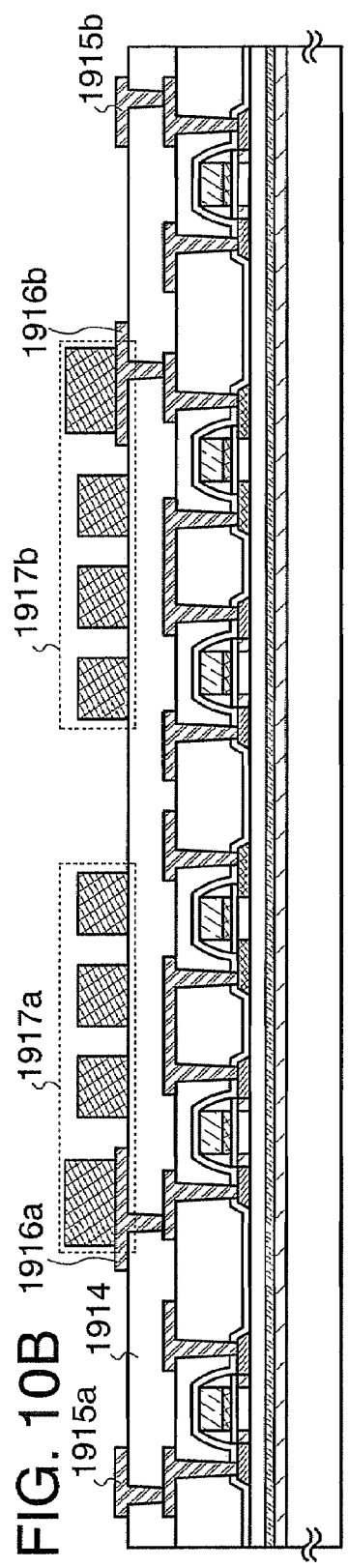

Subsequently, as shown in FIG. 10B, conductive films 1917*a* and 1917*b* functioning as antennas are formed so as to be electrically connected to the conductive films 1916*a* and 1916*b*, respectively.

The insulating film 1914 can be formed of either a single layer or a stacked structure of an insulating film containing oxygen or nitrogen such as silicon oxide ($SiO_x$), silicon nitride ($SiN_x$), silicon oxynitride ($SiO_xN_y$, where x>y>0), or silicon nitride oxide ($SiN_xO_y$, where x>y>0); a film containing carbon such as DLC (diamond-like carbon); an organic material such as epoxy, polyimide, polyamide, polyvinyl phenol, benzocyclobutene, or acrylic; a siloxane material containing a siloxane resin; or the like by a CVD method, a sputtering method, or the like. Note that a siloxane material corresponds to a material that has a bond of Si—O—Si. Siloxane has a skeleton structure with a bond of silicon and oxygen. As a substituent of siloxane, an organic group containing at least hydrogen (e.g., an alkyl group or aromatic hydrocarbon) is used. Alternatively, a fluoro group may be used as the substituent. Further alternatively, both a fluoro group and an organic group containing at least hydrogen may be used as the substituent.

The conductive films 1917*a* and 1917*b* can be formed of a conductive material by a CVD method, a sputtering method, a printing method such as screen printing or gravure printing, a droplet discharging method, a dispensing method, a plating method, or the like. The conductive films 1917*a* and 1917*b* are formed of a single layer or a stacked structure of an element selected from among aluminum, titanium, silver, copper, gold, platinum, nickel, palladium, tantalum, and molybdenum or an alloy material or a compound material containing the element as its main component.

For example, when the conductive films 1917*a* and 1917*b* functioning as antennas are formed by a screen printing method, the antenna can be provided by selective printing of a conductive paste in which conductive particles with a grain diameter of several nanometers to several tens of micrometers are dissolved or dispersed in an organic resin. The conductive particles can be at least one of metal particles selected from among silver, gold, copper, nickel, platinum, palladium, tantalum, molybdenum, and titanium; fine particles of silver halide; and dispersive nanoparticles. In addition, the organic resin included in the conductive paste can be one or more of organic resins which function as a binder, a solvent, a dispersing agent, or a coating material for the metal particles. Typically, an organic resin such as an epoxy resin and a silicone resin can be given as examples. In addition, when forming a conductive film, baking is preferably performed after the conductive paste is applied. For example, in the case of using fine particles (e.g., particles with a grain diameter of greater than or equal to 1 nm and less than or equal to 100 nm) containing silver as its main component as a material of the conductive paste, the conductive paste is baked and hardened at temperatures in the range of greater than or equal to 150° C. and less than or equal to 300° C. to obtain the conductive film. Alternatively, it is also possible to use fine particles containing solder or lead-free solder as the main component. In that case, fine particles with a grain diameter of 20 μm or less are preferably used. Solder and lead-free solder have the advantage of being low in cost.

Figure 10C:
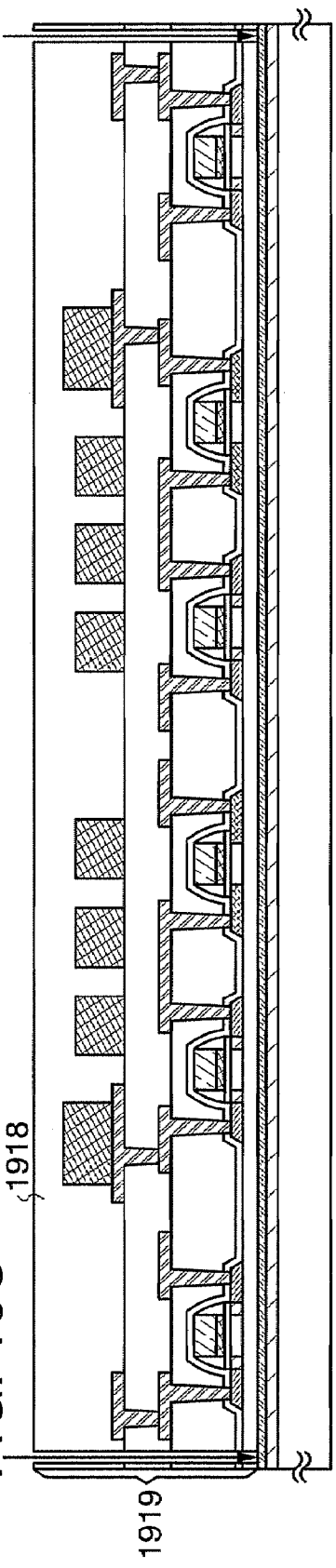

Next, as shown in FIG. 10C, after an insulating film 1918 is formed so as to cover the conductive films 1917*a* and 1917*b*, layers including the thin film transistors 1900*a* to 1900*f*, the conductive films 1917*a* and 1917*b*, and the like (hereinafter referred to as an "element formation layer 1919") are separated from the substrate 1901. Here, after openings are formed in regions excluding the region of the thin film transistors 1900*a* to 1900*f* by laser beam irradiation (e.g., irradiation with UV light), the element formation layer 1919 can be separated from the substrate 1901 using physical force. The peeling layer 1903 may be selectively removed by introduction of an etchant into the openings before the element formation layer 1919 is separated from the substrate 1901. As the etchant, a gas or a liquid containing halogen fluoride or a halogen compound is used. For example, when chlorine trifluoride ($ClF_3$) is used as the gas containing halogen fluoride, the element formation layer 1919 can be separated from the substrate 1901. Note that the whole peeling layer 1903 is not removed but part thereof may be left behind. Accordingly, the amount of etchant used can be reduced and process time for removing the peeling layer can be shortened. In addition, even after the peeling layer 1903 is removed, the element formation layer 1919 can be maintained over the substrate 1901. In addition, by reuse of the substrate 1901 from which the element formation layer 1919 has been separated, cost reduction can be achieved.

The insulating film 1918 can be formed of either a single layer or a stacked structure of an insulating film containing oxygen or nitrogen such as silicon oxide ($SiO_x$), silicon nitride ($SiN_x$), silicon oxynitride ($SiO_xN_y$, where x>y>0), or silicon nitride oxide ($SiN_xO_y$, where x>y>0); a film containing carbon such as DLC (diamond-like carbon); an organic material such as epoxy, polyimide, polyamide, polyvinyl phenol, benzocyclobutene, or acrylic; a siloxane material containing a siloxane resin; or the like by a CVD method, a sputtering method, or the like.

Figure 11A:
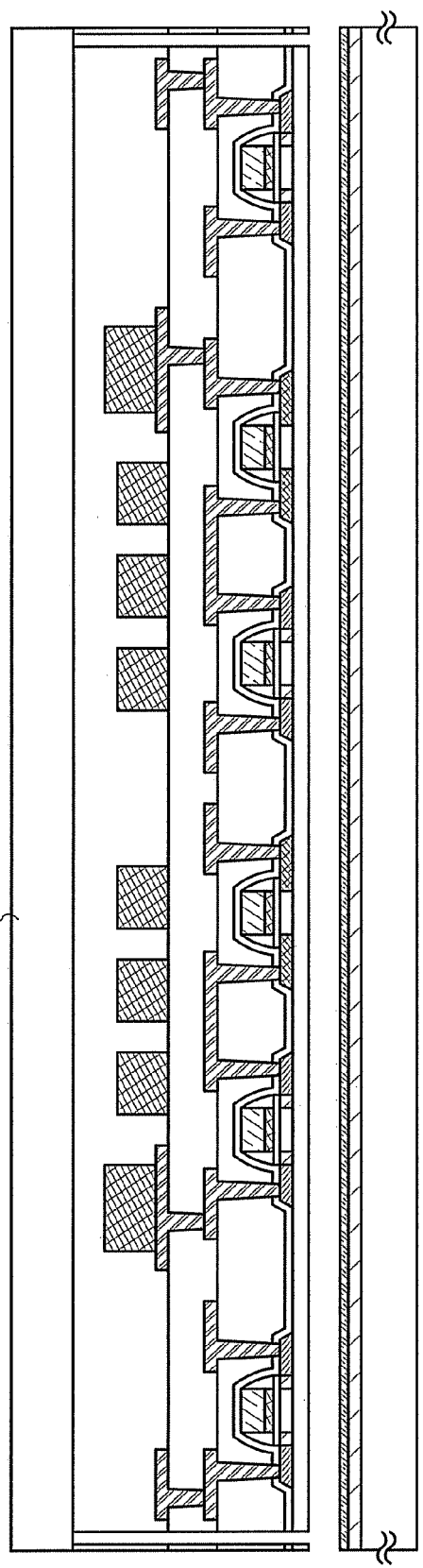
FIGS. 11A and 11B are cross-sectional views showing a method for manufacturing a semiconductor device provided with a clock signal generation circuit of the present invention.

In this embodiment mode, as shown in FIG. 11A, after forming the openings in the element formation layer 1919 by laser beam irradiation, a first sheet material 1920 is attached to one surface of the element formation layer 1919 (the surface where the insulating film 1918 is exposed), and then the element formation layer 1919 is separated from the substrate 1901.

Figure 11B:
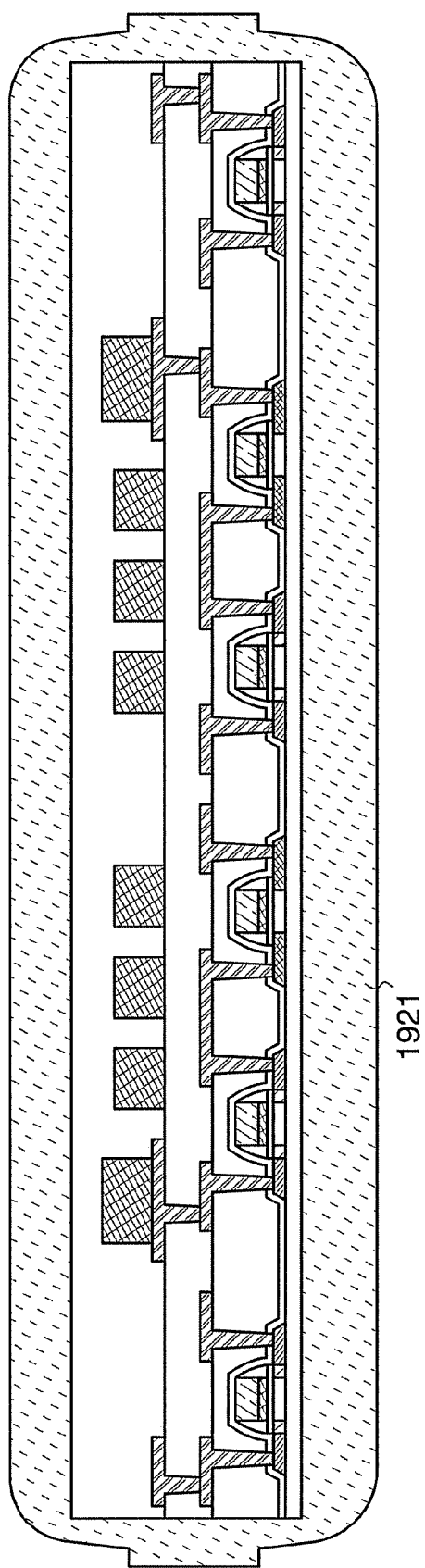

Next, as shown in FIG. 11B, a second sheet material 1921 is attached to the other surface of the element formation layer 1919 (the surface exposed by peeling), followed by one or both of heat treatment and pressurization treatment. As the first sheet material 1920 and the second sheet material 1921, hot-melt films and the like can be used.

As the first sheet material 1920 and the second sheet material 1921, a film on which antistatic treatment for preventing static electricity or the like has been applied (hereinafter referred to as an antistatic film) can be used. As examples of the antistatic film, a film in which an antistatic material is dispersed in a resin, a film to which an antistatic material is attached, and the like can be given. The film provided with an antistatic material can be a film with an antistatic material provided over one of its surfaces, or a film with an antistatic material provided over each of its surfaces. In addition, the film with an antistatic material provided over one of its surfaces may be attached to the layer so that the antistatic material is placed on the inner side of the film or the outer side of the film. The antistatic material may be provided over the entire surface of the film, or over a part of the film. As an antistatic material, a metal, indium tin oxide (ITO), or a surfactant such as an amphoteric surfactant, a cationic surfactant, or a nonionic surfactant can be used. In addition, as an antistatic material, a resin material which contains a cross-linked copolymer having a carboxyl group and a quaternary ammonium base on its side chain, or the like can be used. Such a material is attached, mixed, or applied to a film, so that an antistatic film can be formed. By sealing with the antistatic film, the semiconductor element can be prevented from adverse effects such as external static electricity when being dealt with as a commercial product.

In this embodiment mode, although an example in which the element formation layer 1919 is separated from the substrate 1901 is shown, the element formation layer 1919 may be formed over the substrate 1901 and used as a semiconductor device with no provision of the peeling layer 1903. Note that, when an SOI (silicon on insulator) substrate is used as the substrate 1901, a single crystal semiconductor film may be used as a semiconductor film, and the length of a process of crystallization of a semiconductor film can be shortened.

As described above, using the manufacturing method of this embodiment mode, a small semiconductor device with flexibility in the physical configuration which is provided with the clock signal generation circuit of the present invention that can realize a stable operation can be provided.

Note that this embodiment mode can be combined with any of the other embodiments as appropriate.

Embodiment Mode 4

In this embodiment mode, an example of manufacturing the semiconductor device of the present invention by use of a transistor formed on a single crystal substrate will be described.

First, as shown in FIG. 12A, an element isolation insulating film 2301 for electrically isolating a semiconductor element is formed of an insulating film over a semiconductor substrate 2300. Formation of the element isolation insulating film 2301 makes it possible to electrically isolate a region for forming a transistor (element formation region 2302) from an element formation region 2303.

As the semiconductor substrate 2300, for example, any one of a single crystal silicon substrate which has n-type or p-type conductivity, a compound semiconductor substrate (a GaAs substrate, an InP substrate, a GaN substrate, an SiC substrate, a sapphire substrate, a ZnSe substrate, or the like), and an SOI (silicon on insulator) substrate formed using a bonding method or a SIMOX (separation by implanted oxygen) method can be used.

For formation of the element isolation insulating film 2301, a selective oxidation method (LOCOS (local oxidation of silicon) method), a trench isolation method, or the like can be used.

Further, in this embodiment mode, an example in which a single crystal silicon substrate which has n-type conductivity is used as the semiconductor substrate 2300 and a p-well 2304 is formed in the element formation region 2303 is shown. The p-well 2304 formed in the element formation region 2303 of the semiconductor substrate 2300 can be formed by selective introduction of an impurity element which imparts p-type conductivity into the element formation region 2303. As the impurity element which imparts p-type conductivity, boron (B), aluminum (Al), gallium (Ga), or the like can be used. On the other hand, in the case where a semiconductor substrate which has p-type conductivity is used as the semiconductor substrate 2300, an n-well may be formed in the element formation region 2302 by selective introduction of an impurity element which imparts n-type conductivity.

Note that an impurity element is not introduced into the element formation region 2302 because the semiconductor substrate which has n-type conductivity is used as the semiconductor substrate 2300 in this embodiment mode. However, an n-well may be formed in the element formation region 2302 by introduction of an impurity element which imparts n-type conductivity. As the impurity element which imparts n-type conductivity, phosphorus, arsenic, or the like can be used.

Next, as shown in FIG. 12B, insulating films 2305 and 2306 are formed so as to cover the element formation regions 2302 and 2303, respectively. In this embodiment mode, the insulating films 2305 and 2306 may be formed of silicon oxide films formed in the element formation regions 2302 and 2303 by thermal oxidation of the semiconductor substrate 2300. Alternatively, each of the insulating films 2305 and 2306 may be formed as a stacked layer of a silicon oxide film and a silicon oxynitride film by forming the silicon oxide film by thermal oxidation and then nitriding a surface of the silicon oxide film by nitridation treatment.

Further alternatively, the insulating films 2305 and 2306 may be formed using plasma treatment as described above. For example, by oxidizing or nitriding the surfaces of the semiconductor substrate 2300 by high-density plasma treatment, silicon oxide films or silicon nitride films to be used as the insulating films 2305 and 2306 can be formed in the element formation regions 2302 and 2303.

Next, as shown in FIG. 12C, a conductive film is formed so as to cover the insulating films 2305 and 2306. In this embodiment mode, an example in which a conductive film 2307 and a conductive film 2308 are sequentially stacked as the conductive film is shown. The conductive film may be formed as a single layer of a conductive film or as a stacked structure in which three or more conductive films are stacked.

The conductive film 2307 and the conductive film 2308 can be formed of tantalum, tungsten, titanium, molybdenum, aluminum, copper, chromium, niobium, or the like, a film formed of an alloy containing any of the above metals as its main component, or a film formed of a compound containing any of the above metals. Alternatively, a semiconductor material typified by polycrystalline silicon doped with an impurity element which imparts conductivity, such as phosphorus, may be used. In this embodiment mode, the conductive film 2307 is formed using tantalum nitride, and the conductive film 2308 is formed using tungsten.

Figure 13A:
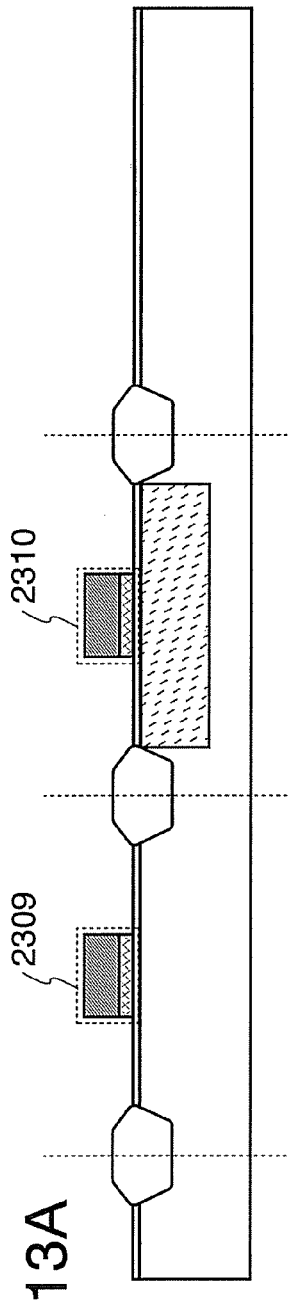
FIGS. 13A to 13C are cross-sectional views showing a method for manufacturing a semiconductor device provided with a clock signal generation circuit of the present invention.

Next, as shown in FIG. 13A, by processing (patterning or the like) the stacked conductive films 2307 and 2308 to have predetermined shapes, a gate electrode 2309 and a gate electrode 2310 are formed over the insulating films 2305 and 2306.

Figure 13B:
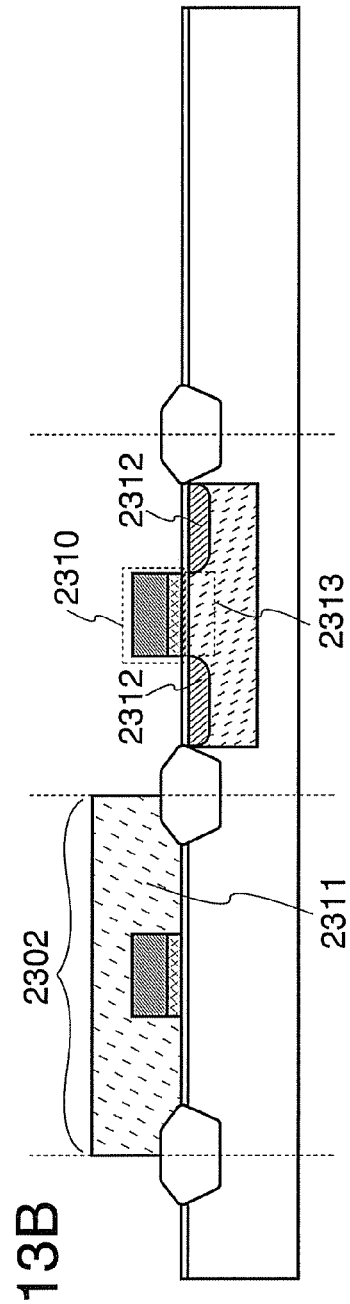

Next, as shown in FIG. 13B, a mask 2311 is selectively formed using a resist so as to cover the element formation region 2302, and an impurity element is introduced into the element formation region 2303. Since the gate electrode 2310 as well as the mask 2311 function as masks, by introduction of the impurity element, impurity regions 2312 functioning as source or drain regions and a channel formation region 2313 are formed in the p-well 2304. As the impurity element, an impurity element which imparts n-type conductivity or an impurity element which imparts p-type conductivity is used. As the impurity element which imparts n-type conductivity, phosphorus, arsenic, or the like can be used. As the impurity element which imparts p-type conductivity, boron, aluminum, gallium, or the like can be used. In this embodiment mode, phosphorus (P) is used as the impurity element.

Figure 13C:
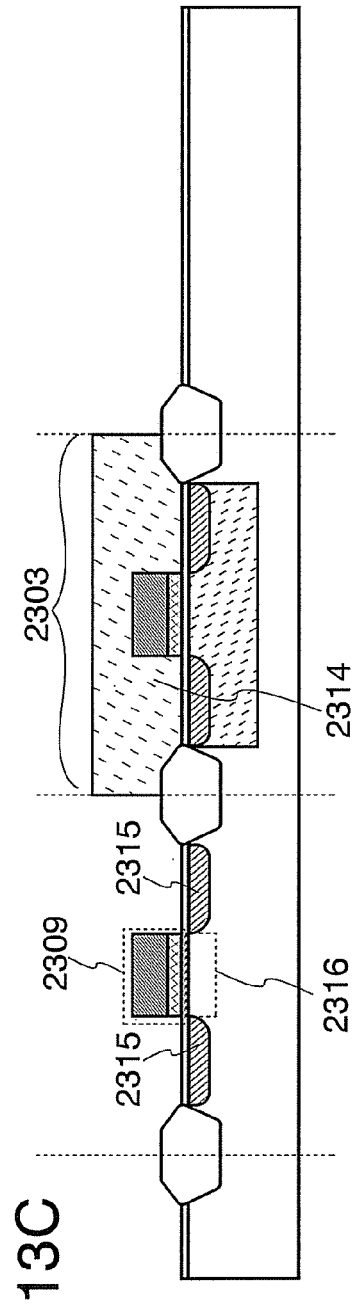

After the mask 2311 is removed, a mask 2314 is selectively formed using a resist so as to cover the element formation region 2303 as shown in FIG. 13C, and an impurity element is introduced into the element formation region 2302. Since the gate electrode 2309 as well as the mask 2314 function as masks, by introduction of the impurity element, impurity regions 2315 functioning as source or drain regions and a channel formation region 2316 are formed in the element formation region 2302 of the semiconductor substrate 2300. As the impurity element, an impurity element which imparts n-type conductivity or an impurity element which imparts p-type conductivity is used. As the impurity element which imparts n-type conductivity, phosphorus, arsenic, or the like can be used. As the impurity element which imparts p-type conductivity, boron, aluminum, gallium, or the like can be used. In this embodiment mode, an impurity element which imparts conductivity which is different from that of the impurity element introduced into the element formation region 2303 in FIG. 13C (for example, boron) is introduced.

Figure 14A:
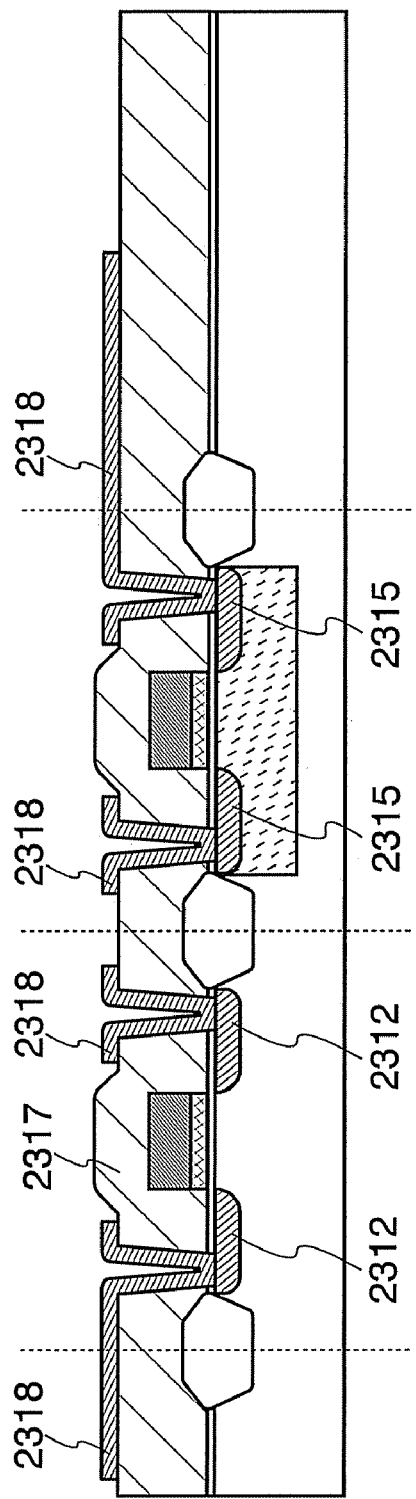
FIGS. 14A and 14B are cross-sectional views showing a method for manufacturing a semiconductor device provided with a clock signal generation circuit of the present invention.

Next, as shown in FIG. 14A, an insulating film 2317 is formed so as to cover the insulating films 2305 and 2306 and the gate electrodes 2309 and 2310, and then contact holes are formed in the insulating film 2317 so that the impurity regions 2312 and 2315 are partially exposed. Then, conductive films 2318 connected to the impurity regions 2312 and 2315 through the contact holes are formed. The conductive films 2318 can be formed by a CVD method, a sputtering method, or the like.

The insulating film 2317 can be formed using an inorganic material, an organic material, or a mixed material of an inorganic material and an organic material. For example, a film containing silicon oxide, silicon oxynitride, silicon nitride oxide, carbon typified by DLC (diamond-like carbon), acrylic, epoxy, polyimide, polyamide, polyvinylphenol, benzocyclobutene, or the like can be used. In addition, the insulating film 2317 can be formed by a CVD method, a sputtering method, a droplet discharging method, a printing method, or the like, depending on the material of the insulating film 2317.

Note that a transistor used for the semiconductor device of the present invention is not limited to a structure described in this embodiment mode. For example, an inversely-staggered structure may be employed.

Figure 14B:
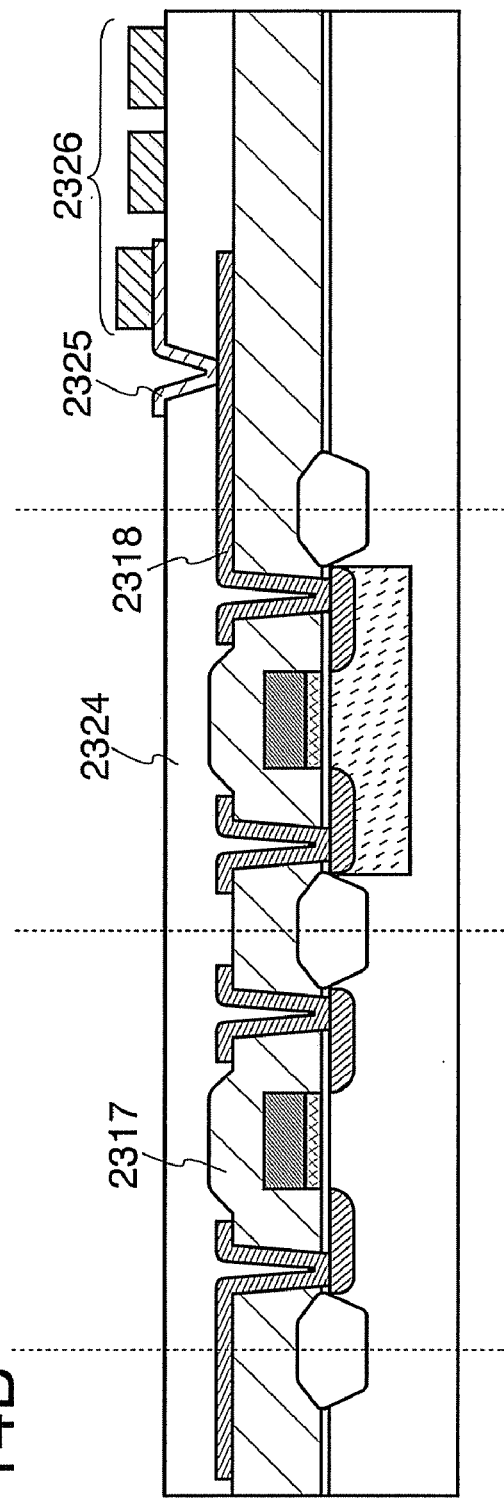
Figure 15A:
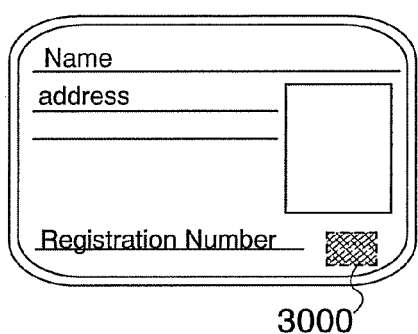
FIGS. 15A to 15F are diagrams showing an example of usage of a semiconductor device provided with a clock signal generation circuit of the present invention.
Figure 15B:
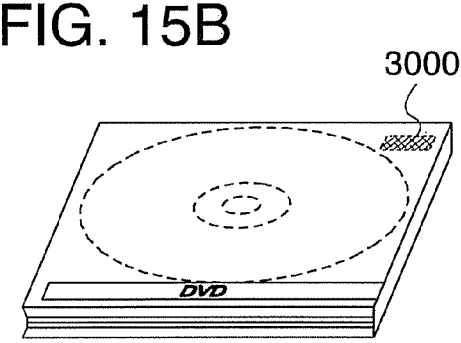
Figure 15C:
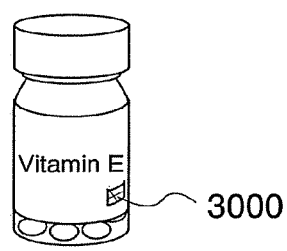
Figure 15D:
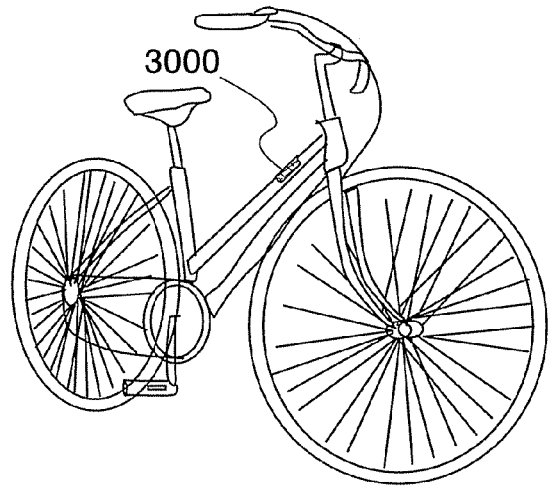
Figure 15E:
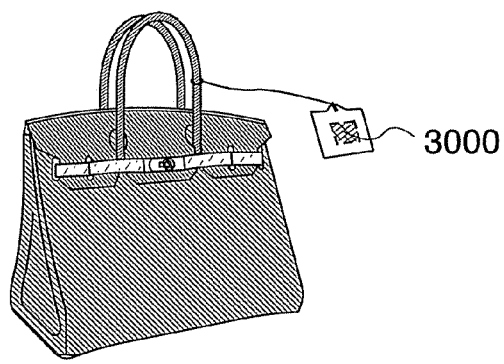
Figure 15F:
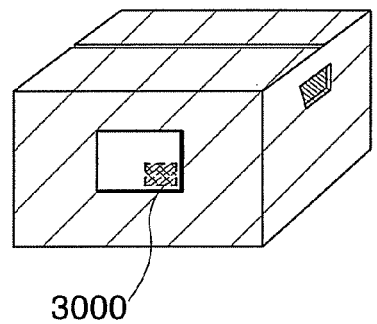

Next, as shown in FIG. 14B, an interlayer film 2324 is formed. Then, the interlayer film 2324 is etched to form a contact hole so that the conductive film 2318 is partially exposed. The interlayer film 2324 is not limited to being a resin and may be any other film such as a CVD oxidation film; however, it is desirable that the interlayer film 2324 be a resin in terms of planarity. Alternatively, a contact hole may be formed using a photosensitive resin and by exposure to light without etching. After that, a wiring 2325 in contact with the conductive film 2318 through the contact hole is formed over the interlayer film 2324.

Next, a conductive film 2326 functioning as an antenna is formed so as to be in contact with the wiring 2325. The conductive film 2326 can be formed using a metal such as silver, gold, copper, palladium, chromium, platinum, molybdenum, titanium, tantalum, tungsten, aluminum, iron, cobalt, zinc, tin, or nickel. Alternatively, as the conductive film 2326, a film formed of an alloy containing any of the above metals as its main component or a film formed of a compound containing any of the above metals may be used instead of a film formed of any of the above metals. The conductive film 2326 can be formed as a single layer of the above film or a stacked layer of the above plurality of films.

The conductive film 2326 can be formed by a CVD method, a sputtering method, a printing method such as screen printing or gravure printing, a droplet discharging method, a dispenser method, a plating method, a photolithography method, an evaporation method, or the like.

Note that an example in which an antenna and a semiconductor element are formed over one substrate is described in this embodiment; however, the present invention is not limited thereto. After formation of the semiconductor element, an antenna which is separately formed may be electrically connected to an integrated circuit. In this case, the antenna and the integrated circuit can be electrically connected to each other after being pressure-bonded with an anisotropic conductive film (ACF), anisotropic conductive paste (ACP), or the like. Alternatively, a conductive adhesive such as a silver paste, a copper paste, or a carbon paste; solder joint; or the like can be used for the connection.

As described above, by using the manufacturing method of this embodiment mode, variations in the characteristics of transistors can be suppressed. Therefore, a semiconductor device provided with the clock signal generation circuit of the present invention, which can be used to reduce the number of transistors used for the semiconductor device and to realize a stable operation, can be provided.

Note that this embodiment mode can be combined with any of the other embodiment modes, as appropriate.

Embodiment Mode 5

In this embodiment mode, an example of usage of a semiconductor device provided with the clock signal generation circuit in the above embodiment modes will be described.

An example of usage of a semiconductor device provided with a clock signal generation circuit in the above embodiment mode will be described with reference to FIGS. 15A to 15F. Although a semiconductor device can be used broadly, it may be used by being mounted in products such as, bills, coins, securities, bearer bonds, certificates (driver's licenses, resident cards, or the like, see FIG. 15A), containers for wrapping objects (wrapping paper, bottles, or the like, see FIG. 15C), recording media (DVDs, video tapes, or the like, see FIG. 15B), vehicles (bicycles or the like, see FIG. 15D), products such as personal belongings (bags, glasses, or the like), foods, plants, animals, human bodies, clothes, commodities, or electronic devices (a liquid crystal display device, an EL display device, a television device, or a cellular phone), or objects such as shipping tags of products (see FIGS. 15E and 15F).

A semiconductor device 3000 of the present invention is mounted on a printed substrate, attached to a surface, or incorporated to be fixed in an object. For example, the semiconductor device is incorporated in paper of a book or an organic resin of a package to be fixed in each object. As for the semiconductor device 3000 of the present invention, a small size, a thin shape, and lightweight are achieved and an attractive design of the object itself is not damaged even after being fixed in the object. In addition, by the semiconductor device 3000 of the present invention being provided in bills, coins, securities, bearer bonds, certificates, or the like, a certification function can be obtained and forgery thereof can be prevented by the use of the certification function being made. Further, by the semiconductor device 3000 of the present invention being provided in containers for wrapping objects, recording media, personal belongings, foods, clothes, commodities, electronic devices, or the like, a system such as an inspection system can be performed efficiently. In addition, even for a vehicle, the level of security against theft or the like can be raised when the semiconductor device of the present invention is attached to the vehicle.

As described above, when a semiconductor device provided with the clock signal generation circuit of the present invention is used for each application given in this embodiment mode, for example, even in the case where communication distance is extended, a stable operation can be realized. Accordingly, authentication characteristics, security, or the like of an article can be improved.

Note that this embodiment mode can be combined with any of the other embodiment modes, as appropriate.

Embodiment 1

In this embodiment, a CPU (hereinafter referred to as a wireless communication CPU) having a wireless communication function which is formed as an example of a semiconductor device of the present invention will be described.

In this embodiment, a wireless communication CPU (hereinafter referred to as a UHF wireless communication CPU) using a wireless signal of a UHF band (915 MHz) will be described. A communication standard of the UHF wireless communication CPU is partially based on Auto-ID Center Class I Region 1 (North America).

Figure 2:
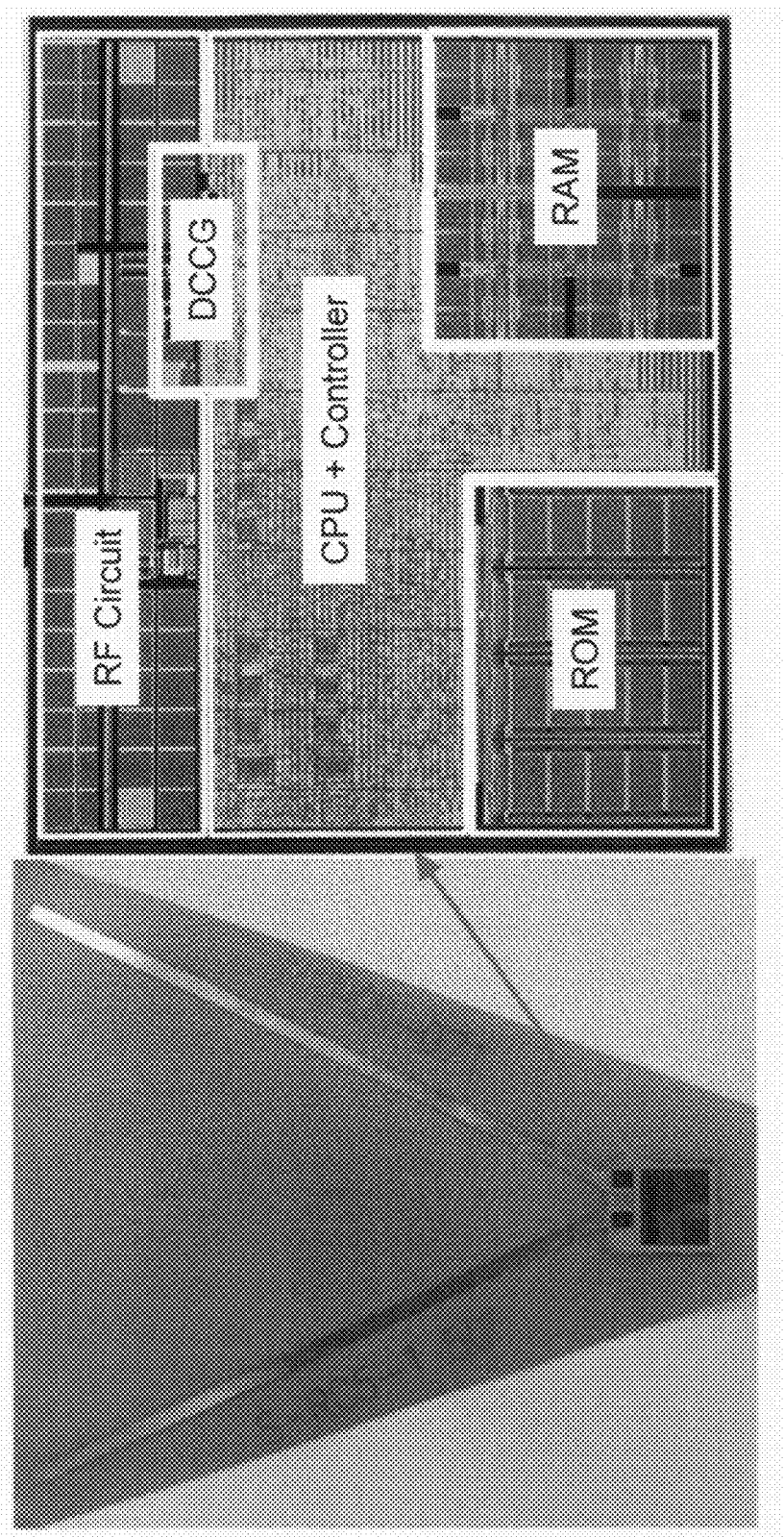
FIG. 2 is a diagram showing an example of a semiconductor device provided with a clock signal generation circuit of the present invention.

A photograph of a plastic UHF wireless communication CPU is shown in FIG. 2. As shown in FIG. 2, in this embodiment, a V-shaped dipole antenna is used for an antenna and formed externally. Note that, as for a circuit structure of the plastic UHF wireless communication CPU in this embodiment, the description of the block diagram of the circuit structure of Embodiment Mode 2 shown in FIG. 3 is referenced here.

Figure 4A:
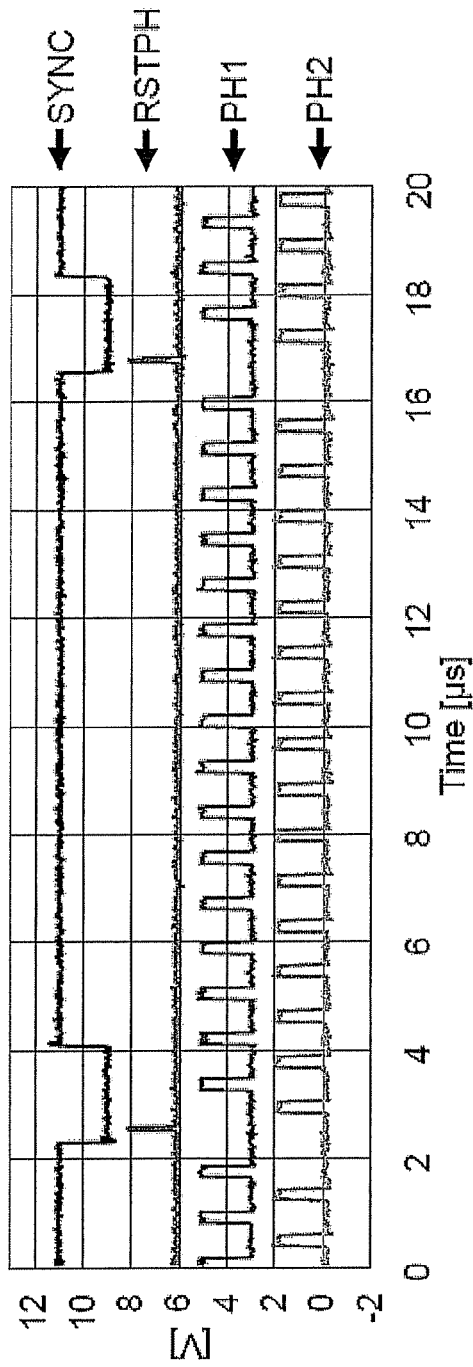
FIGS. 4A and 4B are diagrams each showing a signal waveform of a clock signal generation circuit provided in a semiconductor device of an embodiment.
Figure 4B:
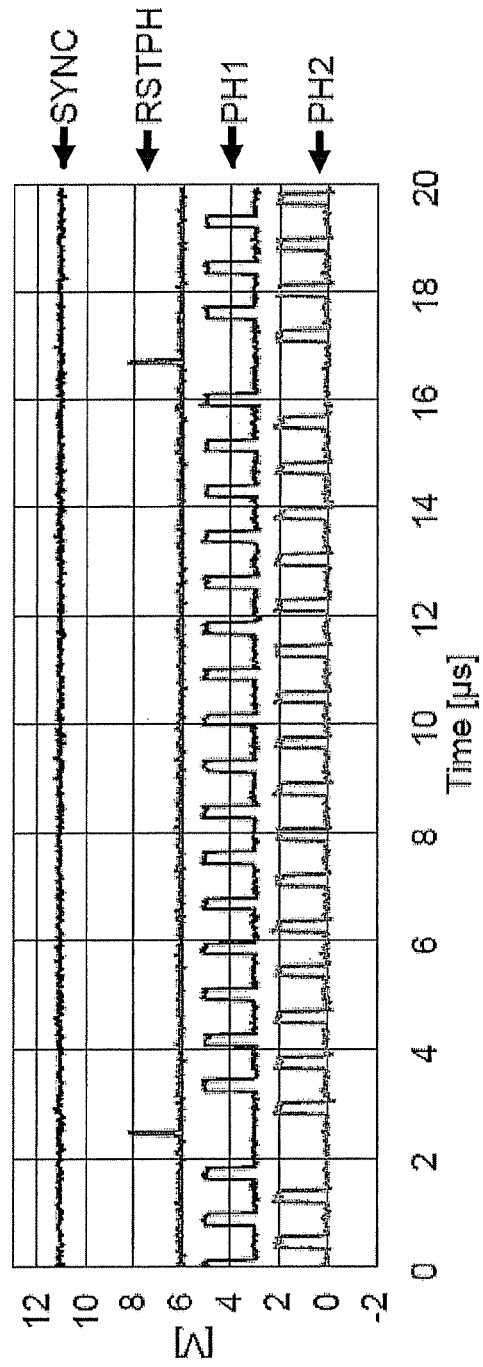

Next, main signal waveform data of the clock signal generation circuit in the wireless communication CPU of this embodiment is shown in FIGS. 4A and 4B. Note that the same structure as the structure described in Embodiment Mode 1 can be applied to a block diagram of the clock signal generation circuit of this embodiment; therefore, the description given in Embodiment Mode 1 is referenced here. Note that, in this embodiment, the clock signal (PH) 117 is made up of PH1 and PH2 which are dual-phase non-overlap clocks with a duty ratio of 25%. As design parameters, $T_0=14.25$ μs, $n_{SYS}=64$, $n_{PH}=16$, and $f_{PH}=1.12$ MHz were adopted, and the constant voltage circuit 307 and the ring oscillator 308 were designed assuming that $n_{T0}=256$, $f_{ROS}=18$ MHz, and $f_{RONS}=18$ MHz.

Next, an operation of the wireless communication CPU of this embodiment will be described with reference to FIGS. 4A and 4B.

FIG. 4A shows signal waveforms of a SYNC period, and FIG. 4B shows signal waveforms of an ASYNC period. When respective PH1s in FIGS. 4A and 4B are compared, they match each other very well, and when respective PH2s in FIGS. 4A and 4B are compared, they match each other very well. Accordingly, it is found that a clock signal to be generated in the clock signal generation circuit included in the semiconductor device of the present invention has an excellent level of stability.

Next, a design outline of the UHF wireless communication CPU is shown in Table 1.

TABLE 1

| UHF RFCPU | manufacturing process | | low temperature poly-silicon TFT 0.8 um design rule peeling and transferring process gate wiring and metal wiring |
|---|---|---|---|
| | numbers of transistors | | 133K |
| | core size (W × H × T) | | 10.5 mm × 8.9 mm × 145 um |
| | mass (excluding an antenna) | | 262 mg |
| | RF circuit | sub-block | power circuit demodulation circuit modulation circuit regulator |
| | clock signal generation | sub-block | reference clock signal generation circuit counter group |
| | logic circuit | CPU | 20K |
| | | numbers of transistors | |
| | | clock frequency | 1.12 MHz |
| | | architecture | 8 bit CISC |
| | ROM | capacitor | 4 KB |
| | RAM | capacitor | 512 B |
| | controller | numbers of transistors | 10K |
| | | sub-block | CPU interface RF interface memory controller |

The CPU 310 in the UHF wireless communication CPU of this embodiment is a CPU of 8-bit CISC architecture. By using the CPU of 8-bit CISC architecture, with respect to a CPU included in an HF wireless communication CPU, the number of clocks per instruction (CPI) could be improved, arithmetic performance was improved by about four times, and a circuit scale was reduced by about 25%. Therefore, while low power consumption could be achieved by setting a clock frequency to about one third (1.12 MHz), arithmetic performance could be improved by about 1.5 times. In addition, an address area of a control register is physically arranged in the RAM so that a circuit scale of the controller 313 could be reduced by about 30%, compared with the HF wireless communication CPU. Therefore, power consumption could be greatly reduced.

The ROM 311 in the wireless communication CPU of this embodiment is a mask ROM having a capacity of 4 kB and stores a program, an ID number, or the like. In the ROM 311, low power consumption can be achieved by subdividing a bit line which is precharged at the time of reading. The RAM 312 is an SRAM having a capacity of 512 bytes and used as a control register as well as a working area of the CPU 310. In addition, in the RAM 312, low power consumption can be achieved by forming a structure in which a memory portion is divided into 16 subblocks and only one subblock is operated at the time of reading/writing. By use of such ingenuity, power consumption in each of the ROM 311 and the RAM 312 was about a quarter of that of the HF wireless communication CPU. A capacity of the ROM 311 could be increased to twice as large as that of the ROM included in the HF wireless communication CPU, and a capacity of the RAM 312 could be increased to eight times as large as that of the RAM included in the HF wireless communication CPU. By increasing the size of a memory area, a function of resistance to side channel attacks could be implemented in an encoding processing function by software, and an encoding function could be reinforced. Note that a DES (data encryption standard) is adopted for an encoding processing routine.

Next, measurement results on wireless communication with the UHF wireless communication CPU of this embodiment will be described.

Figure 6:
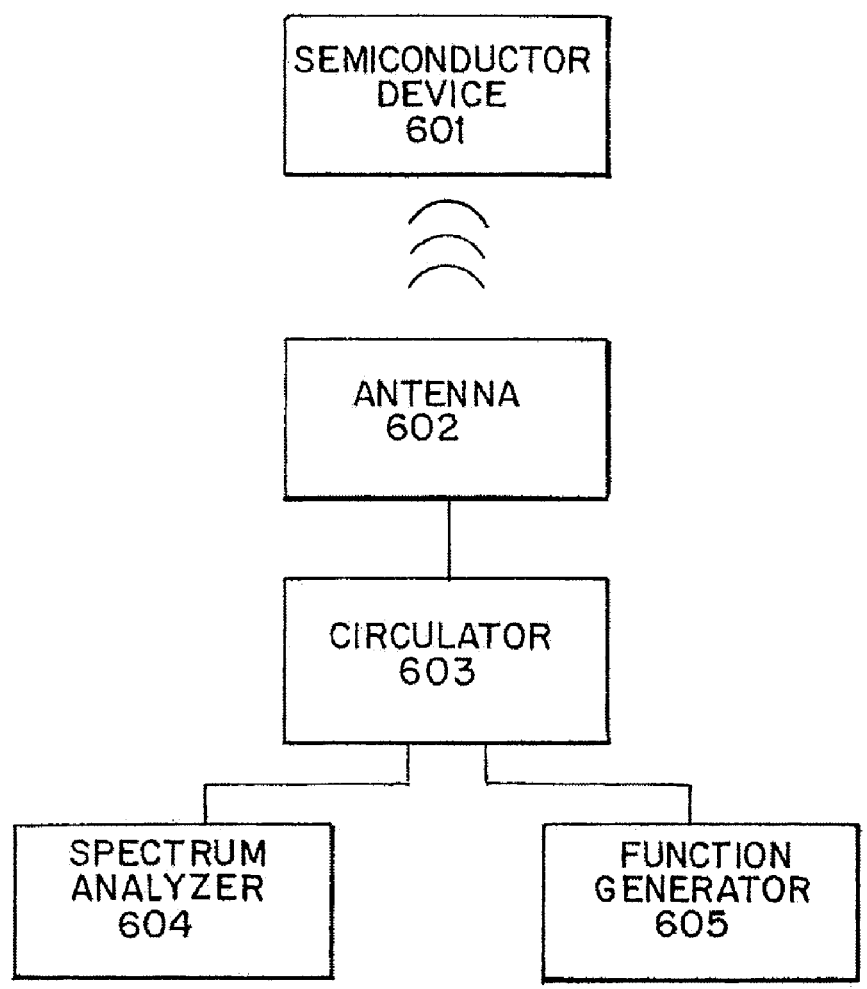
FIG. 6 is a block diagram of a measuring system on wireless communication of an example of a semiconductor device provided with a clock signal generation circuit of the present invention.

First, a measuring system used for this measurement is shown in FIG. 6. In FIG. 6, the measuring system includes a semiconductor device 601, an antenna 602, a circulator 603, a spectrum analyzer 604, and a function generator 605. This measurement is performed in such a way that a transmitted signal is generated in the function generator 605 and transmitted as a wireless signal from the antenna 602 via the circulator 603. In addition, a transmitted signal from the semiconductor device 601 is received by the antenna 602 and input to the spectrum analyzer 604 via the circulator 603.

Figure 5:
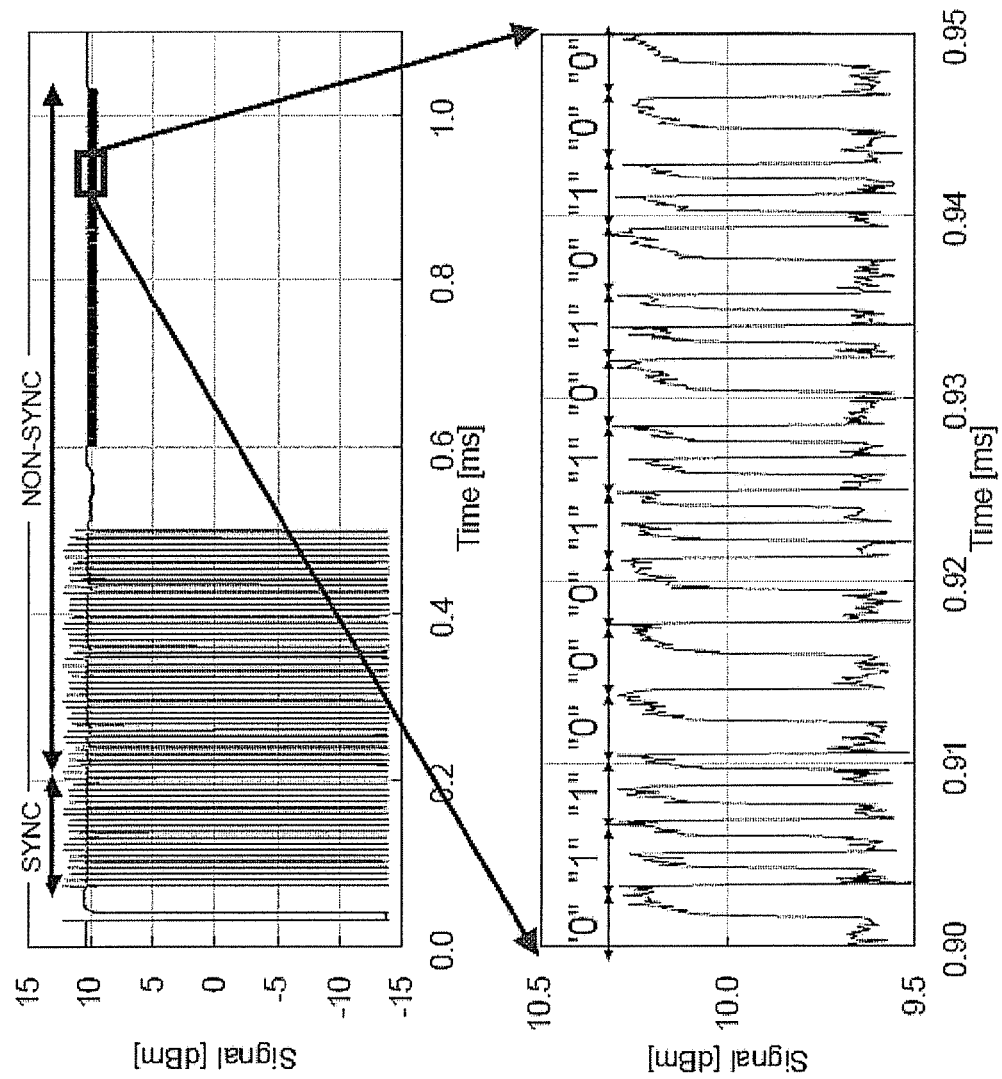
FIG. 5 is a diagram showing a wireless signal waveform of a clock signal generation circuit provided in a semiconductor device of an embodiment.

Next, measurement results are shown in FIG. 5. The measurement results shown in FIG. 5 are results of a response signal waveform of the CPU having the UHF wireless function formed over a glass substrate which are measured by a spectrum analyzer. A communication distance when an antenna output is 30 dBm is 43 cm. In addition, power consumption by the chip when an internally generated power supply voltage is 1.5 V is 0.54 mW. This is about one seventh of the HF wireless communication CPU, and as a result, it can be said that low power consumption can be achieved.

Figure 7:
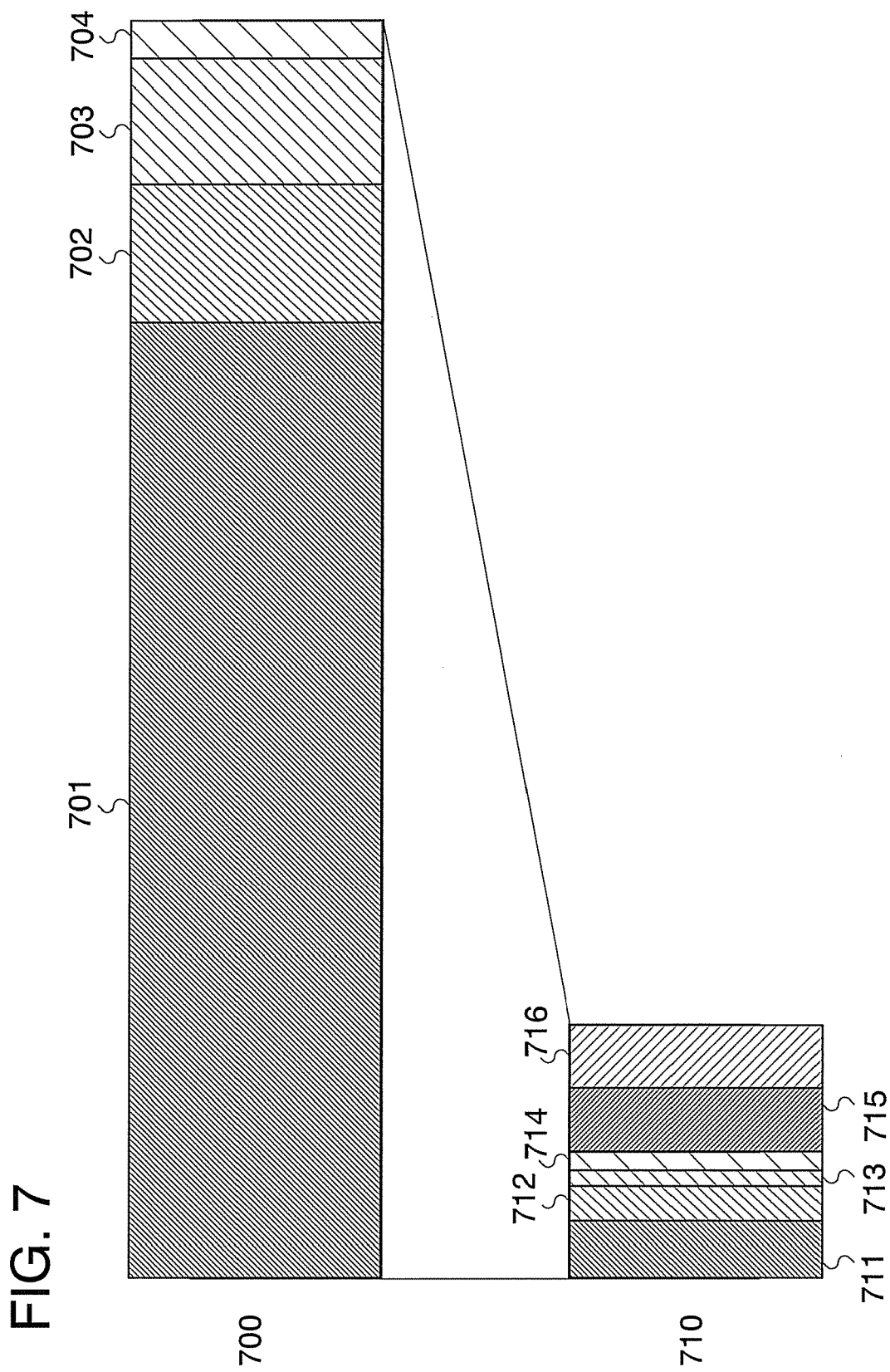
FIG. 7 is a diagram showing power measurement results of an example of a semiconductor device provided with a clock signal generation circuit of the present invention.

Next, measurement results for power consumption of the HF wireless communication CPU and the UHF wireless communication CPU are shown in FIG. 7. In FIG. 7, a first result 700 is a power consumption of 4.1 mW at the time when a power supply voltage is 1.8 V in the HF wireless communication CPU, and a second result 710 is a power consumption of 0.81 mW at the time when a power supply voltage is 1.8 V in the UHF wireless communication CPU. For the first result 700, power consumption 701 of the CPU, power consumption 702 of the controller, power consumption 703 of the ROM, and power consumption 704 of the RAM are shown by a bar graph. In addition, for the second result 710, power consumption 711 of the CPU, power consumption 712 of the controller, power consumption 713 of the ROM, power consumption 714 of the RAM, power consumption 715 of the clock signal generation circuit, and power consumption 716 of the constant voltage circuit are shown by a bar graph. Note that the measurement of power consumption is performed in such a way that power consumption of the wireless communication CPU which is formed over a glass substrate is measured and the power consumption in each block is calculated using a ratio by simulation. As shown in FIG. 7, power consumption of the UHF wireless communication CPU is reduced to about one fifth of the power consumption of the HF wireless communication CPU. Note that the UHF wireless communication CPU can operate at lower voltage, and a power consumption of 0.54 mW, which is very low, is realized at the minimum operating voltage of 1.5 V. As a result, it is found that low power consumption can be realized using the design method used in this embodiment.

In the UHF wireless communication CPU of the present invention, by use of the clock signal generation circuit, generation of a clock signal having a stable frequency, which is unrelated to variations in the characteristics of TFTs, could be realized. In addition, operation efficiency of the CPU was improved and low power consumption was realized by control of the active areas of the memories (ROM: read only memory and RAM: random access memory). Furthermore, by decreasing the number of CPUs and the number of transistors of the controller, an increase in capacity of the memories was realized while a reduction in chip area was realized. By use of the large capacity of each of the memories, a function of resistance to side channel attacks or the like could be implemented by software, and an encoding function could be reinforced.

As described above, a semiconductor device provided with the clock signal generation circuit of the present invention can generate a stable clock signal, and even when wireless communication is employed at the UHF band or the like, for example, a semiconductor device which can realize a stable operation can be provided at low cost.

This application is based on Japanese Patent Application serial No. 2007-029287 filed with Japan Patent Office on Feb. 8, 2007, the entire contents of which are hereby incorporated by reference.

What is claimed is:

1. A clock signal generation circuit comprising:
a first counter circuit configured to generate a first reset signal by using a synchronizing signal and to count the number of rising edges of a first reference clock signal in accordance with the first reset signal;
a second counter circuit configured to generate a second reset signal by using the counted number in the first counter circuit and to count the number of the rising edges of the first reference clock signal in accordance with the second reset signal wherein the second counter circuit is connected to the first counter circuit;
a first divider circuit configured to generate a second reference clock signal by dividing a frequency of the first reference clock signal in accordance with the first reset signal wherein the first divider circuit is connected to the first counter circuit;
a reset signal generation circuit configured to output one of the first reset signal and the second reset signal as a third reset signal wherein the reset signal generation circuit is connected to the first counter circuit and the second counter circuit; and
a second divider circuit configured to generate a clock signal by dividing a frequency of the second reference clock signal in accordance with the third reset signal wherein the second divider circuit connected to the first divider circuit and the reset signal generation circuit.

2. The clock signal generation circuit according to claim 1, wherein each of the first counter circuit, the second counter circuit, the first divider circuit, and the second divider circuit comprises a flip-flop circuit and at least one of a latch circuit, a NOT circuit, an AND circuit, an OR circuit, a NAND circuit, and a NOR circuit.

3. A clock signal generation circuit comprising:
a constant voltage circuit configured to generate a second power supply voltage by using a first power supply voltage;
a reference clock signal generation circuit configured to generate a first reference clock signal by using the second power supply voltage wherein the reference clock signal generation circuit is connected to the constant voltage circuit;
a first counter circuit configured to generate a first reset signal by using a synchronizing signal and to count the number of rising edges of the first reference clock signal in accordance with the first reset signal wherein the first counter circuit is connected to the reference clock signal generation circuit;
a second counter circuit configured to generate a second reset signal by using the counted number in the first counter circuit and to count the number of the rising edges of the first reference clock signal in accordance with the second reset signal wherein the second counter circuit is connected to the first counter circuit and the reference clock signal generation circuit;
a first divider circuit configured to generate a second reference clock signal by dividing a frequency of the first reference clock signal in accordance with the first reset signal wherein the first divider circuit is connected to the first counter circuit and the reference clock signal generation circuit;
a reset signal generation circuit configured to output one of the first reset signal and the second reset signal as a third reset signal wherein the reset signal generation circuit is connected to the first counter circuit and the second counter circuit; and
a second divider circuit configured to generate a clock signal by dividing a frequency of the second reference clock signal in accordance with the third reset signal wherein the second divider circuit connected to the first divider circuit and the reset signal generation circuit.

4. The clock signal generation circuit according to claim 3, wherein each of the first counter circuit, the second counter circuit, the first divider circuit, and the second divider circuit comprises a flip-flop circuit and at least one of a latch circuit, a NOT circuit, an AND circuit, an OR circuit, a NAND circuit, and a NOR circuit.

5. A semiconductor device comprising:
an antenna;
an RF circuit configured to generate a power supply voltage from a signal received from the antenna;
a logic circuit configured to perform an arithmetic processing of the signal received from the antenna; and
a clock signal generation circuit, the clock signal generation circuit comprising:
a first counter circuit configured to generate a first reset signal by using a synchronizing signal and to count the number of rising edges of a first reference clock signal generated based on the power supply voltage in accordance with the first reset signal;
a second counter circuit configured to generate a second reset signal by using the counted number in the first counter circuit and to count the number of the rising edges of the first reference clock signal in accordance with the second reset signal wherein the second counter circuit is connected to the first counter circuit;
a first divider circuit configured to generate a second reference clock signal by dividing a frequency of the first reference clock signal in accordance with the first reset signal wherein the first divider circuit is connected to the first counter circuit;
a reset signal generation circuit configured to output one of the first reset signal and the second reset signal as a third reset signal wherein the reset signal generation circuit is connected to the first counter circuit and the second counter circuit; and
a second divider circuit configured to generate a clock signal by dividing a frequency of the second reference clock signal in accordance with the third reset signal wherein the second divider circuit connected to the first divider circuit and the reset signal generation circuit.

6. The semiconductor device according to claim 5, wherein each of the first counter circuit, the second counter circuit, the first divider circuit, and the second divider circuit comprises a flip-flop circuit and at least one of a latch circuit, a NOT circuit, an AND circuit, an OR circuit, a NAND circuit, and a NOR circuit.

7. The semiconductor device according to claim 5, wherein the RF circuit comprises a power supply circuit, a demodulation circuit, and a modulation circuit.

8. The semiconductor device according to claim 5, wherein the logic circuit comprises a control circuit, a central processing unit, a ROM, and a RAM.

9. A semiconductor device comprising:
an antenna;
an RF circuit configured to generate a first power supply voltage from a signal received from the antenna;
a logic circuit configured to perform an arithmetic processing of the signal received from the antenna; and
a clock signal generation circuit, the clock signal generation circuit comprising:
a constant voltage circuit configured to generate a second power supply voltage by using the first power supply voltage;
a reference clock signal generation circuit configured to generate a first reference clock signal by using the second power supply voltage wherein the reference clock signal generation circuit is connected to the constant voltage circuit;
a first counter circuit configured to generate a first reset signal by using a synchronizing signal and to count the number of rising edges of the first reference clock signal in accordance with the first reset signal wherein the first counter circuit is connected to the reference clock signal generation circuit;
a second counter circuit configured to generate a second reset signal by using the counted number in the first counter circuit and to count the number of the rising edges of the first reference clock signal in accordance with the second reset signal wherein the second counter circuit is connected to the first counter circuit and the reference clock signal generation circuit;
a first divider circuit configured to generate a second reference clock signal by dividing a frequency of the first reference clock signal in accordance with the first reset signal wherein the first divider circuit is connected to the first counter circuit and the reference clock signal generation circuit;

a reset signal generation circuit configured to output one of the first reset signal and the second reset signal as a third reset signal wherein the reset signal generation circuit is connected to the first counter circuit and the second counter circuit; and a second divider circuit configured to generate a clock signal by dividing a frequency of the second reference clock signal in accordance with the third reset signal wherein the second divider circuit connected to the first divider circuit and the reset signal generation circuit.

10. The semiconductor device according to claim 9, wherein each of the first counter circuit, the second counter circuit, the first divider circuit, and the second divider circuit comprises a flip-flop circuit and at least one of a latch circuit, a NOT circuit, an AND circuit, an OR circuit, a NAND circuit, and a NOR circuit.

11. The semiconductor device according to claim 9, wherein the RF circuit comprises a power supply circuit, a demodulation circuit, and a modulation circuit.

12. The semiconductor device according to claim 9, wherein the logic circuit comprises a control circuit, a central processing unit, a ROM, and a RAM.

* * * * *